(12) United States Patent
Tamiya

(10) Patent No.: US 9,074,861 B2
(45) Date of Patent: Jul. 7, 2015

(54) DISPLACEMENT DETECTING DEVICE

(75) Inventor: Hideaki Tamiya, Kanagawa (JP)

(73) Assignee: DMG MORI SEIKI CO., LTD., Yamatokoriyama-shi (JP)

( * ) Notice: Subject to any disclaimer, the term of this patent is extended or adjusted under 35 U.S.C. 154(b) by 262 days.

(21) Appl. No.: 13/617,539

(22) Filed: Sep. 14, 2012

(65) Prior Publication Data

US 2013/0250307 A1  Sep. 26, 2013

(30) Foreign Application Priority Data

Oct. 26, 2011  (JP) .................. 2011-234765
Dec. 28, 2011  (JP) .................. 2011-289648
Jan. 31, 2012  (JP) .................. 2012-018715

(51) Int. Cl.
*G01B 11/02* (2006.01)
*G01B 9/02* (2006.01)

(52) U.S. Cl.
CPC ........ *G01B 9/02015* (2013.01); *G01B 9/02018* (2013.01); *G01B 9/02022* (2013.01); *G01B 2290/70* (2013.01); *G01B 9/02081* (2013.01)

(58) Field of Classification Search
CPC ............ G01B 9/02; G01B 11/14; G01B 7/14; G01B 11/02
USPC ......................... 356/452, 498, 499
See application file for complete search history.

(56) References Cited

U.S. PATENT DOCUMENTS 3,809,481 A * 5/1974 Schindler ................ 356/452
4,676,645 A * 6/1987 Taniguchi et al. ............ 356/494
2001/0015808 A1 * 8/2001 Akihiro .................. 356/499
2009/0310105 A1  12/2009 Kuriyama
2010/0182611 A1 * 7/2010 Sudoh .................... 356/498

FOREIGN PATENT DOCUMENTS

EP  0311144 A2  10/1984
EP  1707917 A2   3/2006
JP  5-89480 A    4/1993

OTHER PUBLICATIONS

Extended European Search Report for Application No./Patent No. 12188526.3-1558/2587212, dated Dec. 12, 2013.

* cited by examiner

*Primary Examiner* — Tarifur Chowdhury
*Assistant Examiner* — Jamil Ahmed
(74) *Attorney, Agent, or Firm* — Oliff PLC

(57) ABSTRACT

A displacement detecting device includes a light source, a beam splitting section, a diffraction grating, a reflecting section, a beam combining section, a light receiving section, and a relative position information output section. The diffraction grating is adapted to diffract a first beam reflected by a surface-to-be-measured of a member-to-be-measured, and cause the diffracted first beam to be incident again on the surface-to-be-measured. The reflecting section is adapted to reflect a second beam split by the beam splitting section to the beam splitting section. The light receiving section is adapted to receive interfering light of the first beam and the second beam. The relative position information output section is adapted to output displacement information of the surface-to-be-measured in the height direction based on intensity of the received interfering light.

12 Claims, 26 Drawing Sheets

DISPLACEMENT DETECTING DEVICE

CROSS REFERENCES TO RELATED APPLICATIONS

The present invention contains subject matter related to Japanese Patent Application JP 2012-018715 filed in the Japanese Patent Office on Jan. 31, 2012, the entire contents of which being incorporated herein by reference.

BACKGROUND OF THE INVENTION

1. Field of the Invention

The present invention relates to a displacement detecting device for detecting displacement of a surface-to-be-measured by a non-contact sensor which uses light emitted from a light source. More particularly, the present invention relates to a technology for detecting vertical displacement of the surface-to-be-measured.

2. Description of the Related Art

Conventionally, a displacement detecting device for measuring displacement and shape of a surface-to-be-measured by light in a non-contact manner is widely used. As a typical example, there is a method in which a laser is irradiated onto the surface-to-be-measured, and change of the position of the reflected light is detected by a PSD. However, the problems with such a method are that it is susceptible to the influence of the tilt of the surface-to-be-measured, that the sensitivity is low, and that if measurement range is widened, the measurement resolution will be degraded.

In contrast to the aforesaid method, there is another method in which a Michelson interferometer is used, wherein the surface-to-be-measured serves as a mirror. With such a method, the measurement range becomes wide and good linearity can be achieved; however, when the measurement range becomes wide, the measurement will be affected by variation in wavelength of the light source and variation in refractive index of the air.

On the other hand, the light emitted from the light source is condensed on the surface-to-be-measured by an objective lens, and the light reflected by the surface-to-be-measured is condensed by an astigmatic optical element and incident on a light receiving element so as to generate a focus error signal by an astigmatic method. Further, by using the focus error signal, a servomechanism is driven to displace the objective lens so that focus position of the objective lens is located on the surface-to-be-measured. At this time, there is a method in which the scale of a linear scale integrally attached to objective lens through a connection member is read to thereby detect the displacement of the surface-to-be-measured (see, for example, Japanese Unexamined Patent Application Publication No. H05-89480). The merits of such a method are that it is less susceptible to the influence of the tilt of the surface-to-be-measured and that it is possible to perform measurement in a wide measurement range with high resolution.

In the displacement detecting device disclosed in Japanese Unexamined Patent Application Publication No. H05-89480, in order to improve the accuracy of the displacement detection, NA (Numerical Aperture) of the objective lens is set large so as to reduce the beam diameter condensed on the surface-to-be-measured. For example, when the beam diameter formed on the surface-to-be-measured is about 2 µm, the detection accuracy of the linear scale will be in a range from several nm to several hundreds nm.

SUMMARY OF THE INVENTION

However, in the displacement detecting device disclosed in Japanese Unexamined Patent Application Publication No. H05-89480, the objective lens is moved up and down in optical axis direction thereof driven by, for example, a drive mechanism such as an actuator which uses a magnet and a coil. Thus, due to the structure and mass of the actuator, there is a limitation in mechanical response frequency of the up-down movement of the objective lens. As a result, with the displacement detecting device disclosed in Japanese Unexamined Patent Application Publication No. H05-89480, it is difficult to measure an object-to-be-measured that rapidly oscillates. Further, although detecting points can be narrowed, there is a problem that big error will be raised due to being affected by the influence of foreign matter on the object-to-be-measured and/or the influence of beam-like minute change of the shape of the object-to-be-measured, so that service conditions are limited.

An object of the present invention is to provide a displacement detecting device capable of accurately detecting the displacement of the member-to-be-measured in the height direction, and capable of performing stable measurement at high speed.

In order to solve the aforesaid problems and achieve the object of the present invention, a displacement detecting device according to an aspect of the present invention comprises: a light source for emitting light, a beam splitting section, a diffraction grating, a reflecting section, a beam combining section, a light receiving section, and a relative position information output section.

The beam splitting section is adapted to split the light emitted from the light source into a first beam to be incident on a member-to-be-measured and a second beam used as reference light. The diffraction grating is adapted to diffract the first beam split by the beam splitting section and reflected by a surface-to-be-measured of the member-to-be-measured, and cause the diffracted first beam to be incident again on the surface-to-be-measured of the member-to-be-measured. The reflecting section is adapted to reflect the second beam split by the beam splitting section. The beam combining section is adapted to superimpose the first beam diffracted by the diffraction grating and reflected again by the surface-to-be-measured and the second beam reflected by the reflecting section on each other. The light receiving section is adapted to receive interfering light of the first beam and the second beam superimposed by the beam combining section. The relative position information output section is adapted to output displacement information of the surface-to-be-measured in the height direction based on intensity of the interfering light received by the light receiving section.

Further, the optical path length of the first beam between the beam splitting section and the beam combining section and the optical path length of the second beam between the beam splitting section and the beam combining section are set to be equal to each other.

Further, a displacement detecting device according to another aspect of the present invention comprises a plurality of displacement detecting sections and an average computing unit. The plurality of displacement detecting sections are adapted to calculate displacement information of a surface-to-be-measured of a member-to-be-measured in the height direction at a plurality of mutually different arbitrary points. The average computing unit is adapted to calculate the average value of the displacement information calculated by the plurality of displacement detecting sections.

The plurality of displacement detecting sections each have the same configuration as that of the aforesaid displacement detecting device.

With the displacement detecting devices of the present invention, since the conventional drive mechanism is not necessary, the heat generated during use can be reduced. Further, since it is not necessary to drive the drive mechanism, there will be no problem of response frequency, and therefore service conditions can be eased.

Further, since the optical path length of the first beam and the optical path length of the second beam are set to be equal to each other, even if there is wavelength variation of the light source caused by the variation in atmospheric pressure, humidity and temperature, it is possible to make the first beam and the second beam to be equally affected. As a result, it is possible to perform stable measurement without performing atmospheric pressure correction, humidity correction and temperature correction.

BRIEF DESCRIPTION OF THE DRAWINGS

FIG. 18A and FIG. 18B are views showing examples of a diffraction grating of the displacement detecting device according to the ninth embodiment, wherein FIG. 18A is a cross-sectional view of a first example of the diffraction grating, and FIG. 18B is a cross-sectional view of a second example of the diffraction grating;

FIG. 29A and FIG. 29B each show a block-to-be-measured used in the displacement detecting device shown in FIG. 27, wherein FIG. 29A is a plan view showing an example of the block-to-be-measured, and FIG. 29B is a plan view showing another example of the block-to-be-measured;

DETAILED DESCRIPTION OF THE PREFERRED EMBODIMENTS

Figure 1:
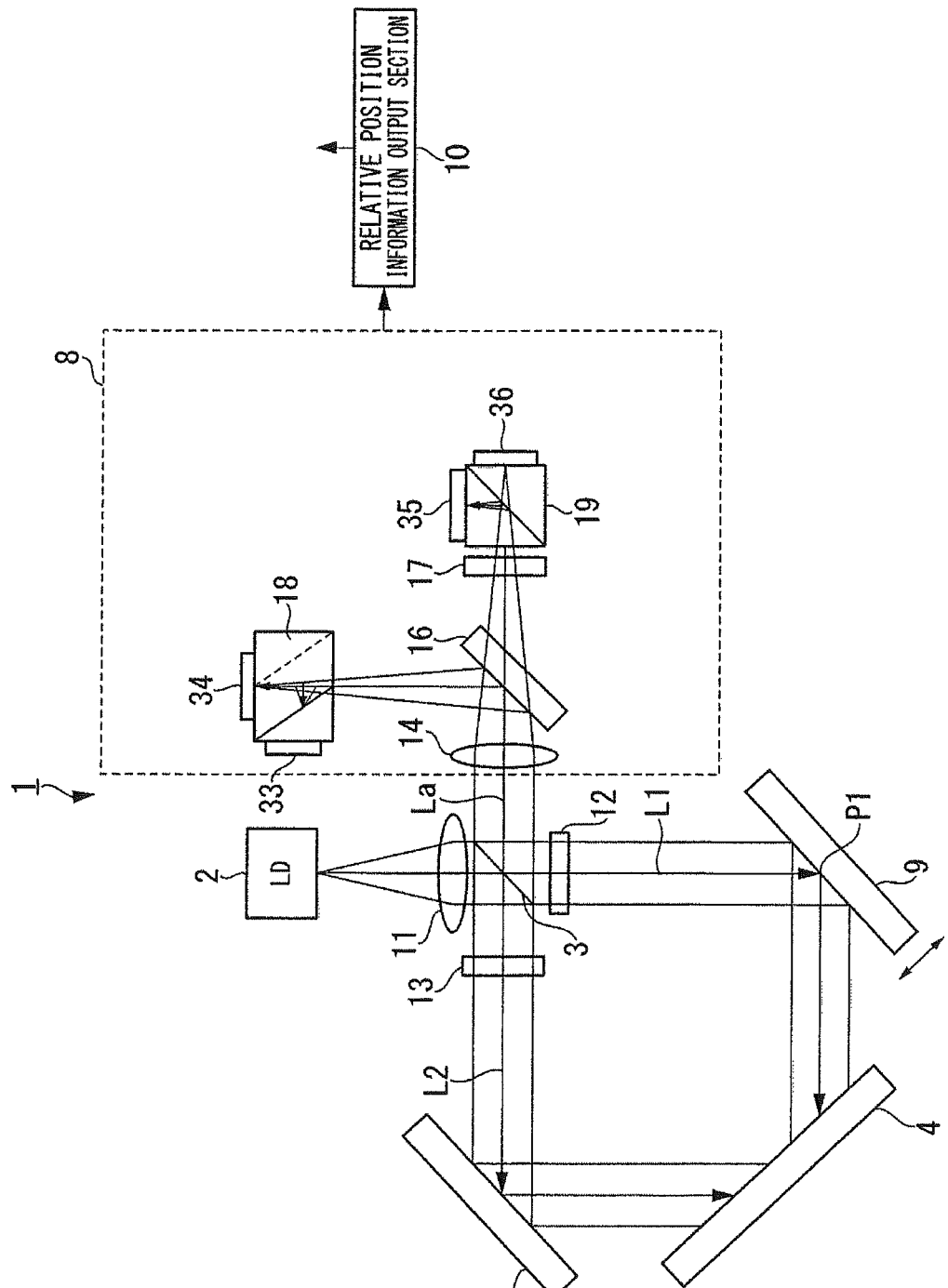
FIG. 1 is a view schematically showing the configuration of a displacement detecting device according to a first embodiment of the present invention.

Displacement detecting devices according to various embodiments of the present invention will be described below with reference to FIGS. 1 to 31. It should be noted that, in the drawings, like components are denoted by like reference numerals. It should also be noted that the present invention is not limited to the following embodiments.

It should be further noted that each of various lenses described below may either be a single lens or a lens group.

1. Displacement Detecting Device According to First Embodiment

First, the configuration of a displacement detecting devices 1 according to a first embodiment (referred to as "the present embodiment" hereinafter) of the present invention will be described below with reference to FIGS. 1 to 5.

1-1. Configuration Example of Displacement Detecting Device

Figure 2:
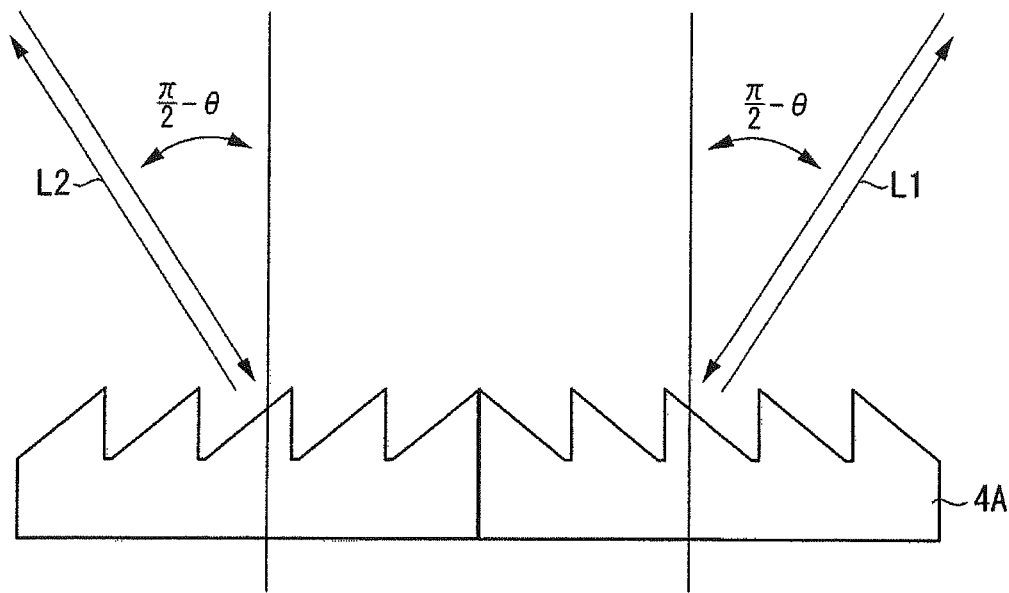
FIG. 2 is a side view showing an example of a diffraction grating of the displacement detecting device according to the first embodiment.
Figure 3:
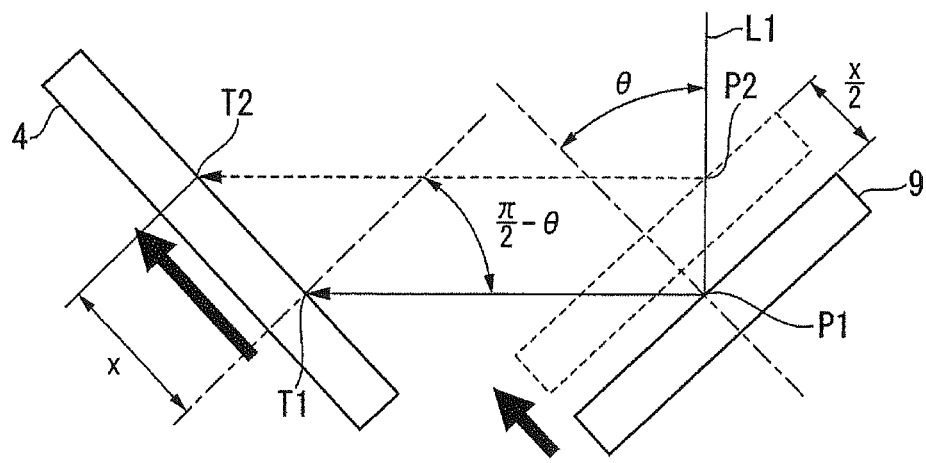
FIG. 3 is a view for explaining a primary portion of the displacement detecting device according to the first embodiment.
Figure 4:
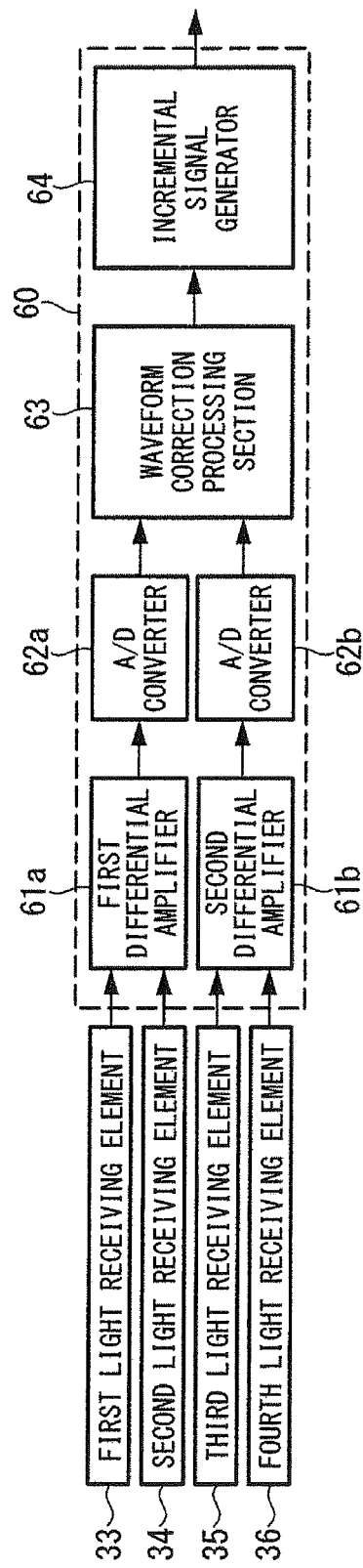
FIG. 4 is a block diagram of a relative position information output section of the displacement detecting device according to the first embodiment.

FIG. 1 is a view schematically showing the configuration of a displacement detecting device 1, FIG. 2 is a side view showing an example of a diffraction grating of the displacement detecting device 1, FIG. 3 is a view for explaining a primary portion of the displacement detecting device 1, and FIG. 4 is a block diagram showing schematic configuration of a relative position information output section of the displacement detecting device 1.

The displacement detecting device 1 according to the present embodiment is a displacement detecting device capable of detecting vertical displacement of a surface-to-be-measured by using a diffraction grating. As showing in FIG. 1, the displacement detecting device 1 includes a light source 2, a beam splitting section 3, a diffraction grating 4, a mirror 6 (which is an example of a reflecting section), and a light receiving section 8, wherein the beam splitting section 3 splits the light emitted from the light source 2 into two beams. The displacement detecting device 1 further includes a relative position information output section 10 adapted to output relative position information (i.e., displacement information) of a member-to-be-measured 9 in a direction perpendicular to the surface-to-be-measured (i.e., the height direction).

Examples of the light source 2 include a semiconductor laser diode, a super luminescent diode, a gas laser, solid-state laser, a luminescent diode and the like.

If a light source having long coherence length is used as the light source 2, there will be less influence of the optical path length difference between the object light and the reference light caused by the tilt of the surface-to-be-measured of the member-to-be-measured 9, and therefore permissible range of tilt will become wider. Further, the shorter the coherence length of the light source 2 is, the better the noise caused by interference of unnecessary stray light can be prevented, and therefore it is possible to perform measurement with high accuracy.

Further, when a single-mode laser is used as the light source 2, it is preferred to control the temperature of the light source 2 in order to stabilize the wavelength. Further, it is also possible to superimpose a high-frequency wave or the like on the light of a single-mode laser to reduce the coherence of the light. Further, in the case where a multi-mode laser is used as the light source 2, the noise caused by interference of unnecessary stray light can be prevented by controlling the temperature of the light source 2 by using a Peltier element, so that it becomes possible to perform more stable measurement.

The light emitted from the light source 2 is incident on the beam splitting section 3. A lens 11 is arranged between the light source 2 and the beam splitting section 3, wherein the lens 11 is a collimator lens or the like. The lens 11 collimates the light emitted from the light source 2 into parallel light, and the parallel light is incident on the beam splitting section 3.

The beam splitting section 3 splits the collimated light into a first beam L1 (which is object light) and a second beam L2 (which is reference light). The first beam L1 is irradiated onto the member-to-be-measured 9, and the second beam L2 is irradiated onto the mirror 6. Further, in the light from the light source 2, the beam splitting section 3 reflects the s-polarized light and transmits the p-polarized light, for example.

It is preferred that the ratio of the light amount of the first beam L1 to the light amount of the second beam L2 is set to a value so that when being incident on the light receiving section 8, the light amount on the member-to-be-measured 9 side and the light amount on the mirror 6 side become equal to each other.

Further, a polarizing plate may also be provided between the light source 2 and the beam splitting section 3. With such an arrangement, a trace of leaked light and/or noise existing as polarization component perpendicular to the polarization direction of the polarizing plate can be removed.

A first phase plate 12 is arranged between the beam splitting section 3 and the member-to-be-measured 9, and a second phase plate 13 is arranged between the beam splitting section 3 and the mirror 6. The first phase plate 12 and the second phase plate 13 are each a quarter-wave plate or the like.

The member-to-be-measured 9 reflects the first beam L1 to the diffraction grating 4. Incidentally, a mirror and/or the like is used as the member-to-be-measured 9. A detail configuration example of the member-to-be-measured 9 will be described later. The diffraction grating 4 of the present embodiment is a reflective diffraction grating that reflects and diffracts the light incident thereon.

Further, the member-to-be-measured 9 reflects the first beam L1 diffracted by the diffraction grating 4 to the beam splitting section 3 again. The diffraction grating 4 is arranged so that it extends substantially at a right angle with respect to the surface-to-be-measured of the member-to-be-measured 9 (i.e., the angle between the diffraction surface of the diffraction grating 4 and the surface-to-be-measured of the member-to-be-measured 9 is substantially 90°).

The accuracy of arranging the diffraction grating 4 with respect to the member-to-be-measured 9 is set variously depending on the required measurement accuracy of the displacement detecting device 1. To be specific, in the case where high accuracy of the displacement detecting device 1 is required, it is preferred that the diffraction grating 4 is arranged with respect to the surface-to-be-measured of the member-to-be-measured 9 in a range of 90°±0.5°. In contrast, in the case where the displacement detecting device 1 is used to perform measurement with low accuracy, such as being used for a machine tool or the like, it will be sufficient to arrange the diffraction grating with respect to the surface-to-be-measured of the member-to-be-measured 9 in a range of 90°±2°.

Further, the first beam L1 incident on the diffraction grating 4 is reflected and diffracted by the diffraction grating 4. The grating pitch Λ of the diffraction grating 4 is set so that the diffraction angle is substantially equal to the incidence angle on the diffraction grating 4. In other words, if the incidence angle on the surface-to-be-measured is θ and the wavelength of the light is λ, then it is preferred that the grating pitch Λ of the diffraction grating 4 is set to a value that satisfies the following Equation 1. Incidentally, as described above, since the diffraction grating 4 is arranged so that it extends at a right angle with respect to the surface-to-be-measured of the member-to-be-measured 9, the incidence angle on the diffraction grating 4 is π/2−θ.

$$\Lambda = \lambda/(2\sin(\pi/2-\theta))$$ [Equation 1]

Thus, the optical path along which the first beam L1 is reflected and diffracted by the diffraction grating 4 and incident again on the member-to-be-measured 9 is superimposed on the optical path along which the first beam L1 split by the beam splitting section 3 is reflected by the member-to-be-measured 9 and incident on the diffraction grating 4. As a result, the point at which the first beam L1 diffracted by the diffraction grating 4 returns to the member-to-be-measured 9 is coincident with the irradiation spot P1 at which the first beam L1 was irradiated onto the member-to-be-measured 9 from the beam splitting section 3. Further, the first beam L1 is reflected again by the member-to-be-measured 9 so as to return to the beam splitting section 3 along the same optical path as that along which the first beam L1 was irradiated from the beam splitting section 3.

Incidentally, a diffraction grating 4A shown in FIG. 2 may be used as the diffraction grating.

FIG. 2 is a side view showing an example of the diffraction grating.

As shown in FIG. 2, the diffraction grating 4A is a so-called "blazed diffraction grating" which has a saw-like groove cross-section shape. With such a diffraction grating 4A, the diffraction efficiency of both the first beam L1 reflected by the member-to-be-measured 9 and the second beam L2 reflected by the mirror 6 can be increased, and noise of signal can be reduced.

Further, as shown in FIG. 1, the mirror 6 is adapted to reflect the second beam L2 split by the beam splitting section 3 to the diffraction grating 4. The mirror 6 is arranged opposite to the member-to-be-measured 9 with the diffraction grating 4 interposed therebetween. Further, the reflecting surface of the mirror 6 and the surface-to-be-measured of the member-to-be-measured 9 are substantially parallel to each other. Thus, the mirror 6 and the diffraction grating 4 are arranged so that the angle between the reflecting surface of the mirror 6 and the diffraction surface of the diffraction grating 4 become approximately 90°.

Further, the mirror 6 reflects the second beam L2 diffracted by the diffraction grating 4 to the beam splitting section 3 again. Incidentally, similar to the first beam L1, the second beam L2 reflected by the mirror 6 and diffracted by the diffraction grating 4 returns to the beam splitting section 3 along the same optical path as that along which the second beam L2 was irradiated from the beam splitting section 3.

The mirror 6 is arranged so that the optical path length of the first beam L1 from the beam splitting section 3 to the diffraction grating 4 is equal to the optical path length of the second beam L2 from the beam splitting section 3 to the diffraction grating 4. Due to the provision of the mirror 6, when producing the displacement detecting device 1, it becomes easy to adjust the optical path length of the first beam L1, the optical path length of the second beam L2, and the angle of the optical axis. As a result, it is possible to make it less susceptible to the influence of the wavelength variation of the light source 2 caused by variation in atmospheric pressure, humidity and temperature.

As described above, similar to the relationship between the member-to-be-measured 9 and the diffraction grating 4, it is preferred that the mirror 6 and the diffraction grating 4 are arranged so that the angle between the reflecting surface of the mirror 6 and the diffraction surface of the diffraction grating 4 is approximately right angle. Thus, the optical path along which the light is diffracted by the diffraction grating 4 and incident again on the mirror 6 is superimposed on the optical path along which the light is reflected by the mirror 6 and incident on diffraction grating 4.

Further, the beam splitting section 3 superimposes the first beam L1 and the second beam L2 respectively reflected by the member-to-be-measured 9 and the mirror 6 so as to return to the beam splitting section 3 on each other, and irradiates the superimposed beams to the light receiving section 8. In other words, the beam splitting section 3 of the present embodiment plays a role both as a beam splitting section for splitting light and as a beam combining section for superimposing the first beam L1 and the second beam L2 on each other.

Here, the length of the path going from the beam splitting section 3 and returning to the beam splitting section 3 through the member-to-be-measured 9 and the diffraction grating 4 and the length of the path going from the beam splitting section 3 and returning to the beam splitting section 3 through the mirror 6 and the diffraction grating 4 are set to be substantially equal to each other. In other words, since the optical path length of the first beam L1 and the optical path length of the second beam L2 are set to be equal to each other, even if there is wavelength variation of the light source caused by variation in atmospheric pressure, humidity and temperature, it is possible to make the first beam L1 and the second beam L2 to be equally affected by the wavelength variation. As a result, regardless of ambient environment, it is possible to perform stable measurement without performing atmospheric pressure correction, humidity correction and temperature correction.

The light receiving section 8 includes a condensing lens 14, a half mirror 16, a first polarizing beam splitter 18 and a second polarizing beam splitter 19, wherein the condensing lens 14 is adapted to condense the first beam L1 and the second beam L2 incident thereon from the beam splitting section 3, and the half mirror 16 is adapted to split the light. Further, a light receiving side phase plate 17 (which is, for example, a quarter-wave plate or the like) is arranged in the optical path between the half mirror 16 and the second polarizing beam splitter 19.

The first polarizing beam splitter 18 is arranged so that the polarization direction of the beam incident thereon is tilted at 45 degrees with respect to the incidence surface of the first polarizing beam splitter 18. A first light receiving element 33 and a second light receiving element 34 are arranged on the light-emitting side of the first polarizing beam splitter 18. A third light receiving element 35 and a fourth light receiving element 36 are arranged on the light-emitting side of the second polarizing beam splitter 19.

The first polarizing beam splitter 18 and the second polarizing beam splitter 19 are each adapted to reflect the interfering light containing the s-polarized light component and transmit the interfering light containing the p-polarized light component, to thereby split the light.

Further, the relative position information output section 10 is connected to the light receiving section 8. As shown in FIG. 4, the relative position information output section 10 includes a first differential amplifier 61a, a second differential amplifier 61b, a first A/D converter 62a, a second A/D converter 62b, a waveform correction processing section 63, and an incremental signal generator 64.

The first light receiving element 33 and the second light receiving element 34 are connected to the first differential amplifier 61a, and the third light receiving element 35 and the fourth light receiving element 36 are connected to the second differential amplifier 61b. Further, the first A/D converter 62a is connected to the first differential amplifier 61a, and the second A/D converter 62b is connected to the second differential amplifier 61b. Further, the waveform correction processing section 63 is connected to both the first A/D converter 62a and the second A/D converter 62b.

1-2. Operation of Displacement Detecting Device

Next, the operation of the displacement detecting device of the present embodiment will be described below with reference to FIG. 1, FIG. 3 and FIG. 4.

As shown in FIG. 1, the light emitted from the light source 2 is collimated by the lens 11 so as to become parallel light. Further, the parallel light collimated by the lens 11 is incident on the beam splitting section 3. The light incident on the beam splitting section 3 is split into the first beam L1 and the second beam L2. Here, in the light from the light source 2, the beam splitting section 3 reflects the s-polarized light and transmits the p-polarized light. Thus, the first beam L1, which is the p-polarized light transmitted through the beam splitting section 3, is irradiated onto the first phase plate 12, and the second beam L2, which is the s-polarized light reflected by the beam splitting section 3, is irradiated onto the second phase plate 13.

Further, the first beam L1 and the second beam L2 are converted into circularly polarized light by the first phase plate 12 and the second phase plate 13. As shown in FIG. 3, the first beam L1 (which has become circularly polarized light) is incident at an arbitrary irradiation spot P1 on the surface-to-be-measured of the member-to-be-measured 9 at an incidence angle θ. Further, the first beam L1 is reflected by the member-to-be-measured 9 so as to be incident at a diffraction position T1 on the diffraction grating 4 at an incidence angle π/2−θ.

The first beam L1 incident on the diffraction grating 4 is diffracted by the diffraction grating 4, and the diffracted first beam L1 is incident again on the member-to-be-measured 9. Next, the diffracted first beam L1 incident again on the member-to-be-measured 9 is reflected by the member-to-be-measured 9 so as to be irradiated onto the first phase plate 12.

On the other hand, the second beam L2 irradiated onto the mirror 6 is reflected by the mirror 6 so as to be irradiated onto the diffraction grating 4. Further, similar to the first beam L1, the second beam L2 is diffracted by the diffraction grating 4 so as to be incident again on the mirror 6.

As described above, since the mirror 6 is arranged so that the optical path length of the first beam L1 from the beam splitting section 3 to the diffraction grating 4 is equal to the optical path length of the second beam L2 from the beam splitting section 3 to the diffraction grating 4, even if there is wavelength variation of the light source caused by variation in atmospheric pressure, humidity and temperature, it is possible to make the first beam L1 and the second beam L2 to be equally affected by the wavelength variation.

Further, the first beam L1 and the second beam L2 are both incident on the diffraction grating 4 and diffracted by the diffraction grating 4. Thus, even if there is variation in diffraction angle of the diffraction grating 4 caused by the variation in temperature, it is possible to make the first beam L1 and the second beam L2 to be equally affected by the variation in diffraction angle of the diffraction grating 4.

The second beam L2 incident again on the mirror 6 is reflected by the mirror 6 so as to be irradiated onto the second phase plate 13. By passing through the first phase plate 12, the first beam L1 becomes a linearly polarized light perpendicular to the advancing direction (i.e., becomes s-polarized light). Further, by passing through the second phase plate 13, the second beam L2 becomes a linearly polarized light perpendicular to the advancing direction (i.e., becomes p-polarized light). Thus, the first beam L1 is reflected by the beam splitting section 3 and irradiated onto the light receiving section 8. Further, the second beam L2 is transmitted through the beam splitting section 3 and irradiated onto the light receiving section 8. Thus, a beam La, which is obtained by superimposing the first beam L1 and the second beam L2 (which are two mutually perpendicular linearly polarized lights) on each other, is incident on the light receiving section 8.

The beam La is condensed by the condensing lens 14 and irradiated onto the half mirror 16. The half mirror 16 splits the beam La into two beams. The beam La reflected by the half mirror 16 is incident on the first polarizing beam splitter 18.

Here, the first polarizing beam splitter 18 is obliquely disposed so that the polarization direction of the first beam L1 and the polarization direction of the second beam L2 (which are different from each other by 90 degrees) are respectively tilted by 45 degrees with respect to the incidence surface of the first polarizing beam splitter 18. Thus, the first beam L1 and the second beam L2 respectively have the p-polarized light component and the s-polarized light component with respect to the first polarizing beam splitter 18. Thus, in the first beam L1 and the second beam L2 transmitted through the first polarizing beam splitter 18, the two polarized lights having the same polarization direction interfere with each other. Thus, it is possible to cause the first beam L1 and the second beam L2 to interfere with each other by the first polarizing beam splitter 18.

Similarly, in the first beam L1 and the second beam L2 reflected by the first polarizing beam splitter 18, the two polarized lights having the same polarization direction with respect to the first polarizing beam splitter 18 interfere with each other. Thus, it is possible to cause the first beam L1 and the second beam L2 to interfere with each other by the first polarizing beam splitter 18.

The interfering light of the first beam L1 and the second beam L2 reflected by the first polarizing beam splitter 18 is received by the first light receiving element 33. The interfering light of the first beam L1 and the second beam L2 transmitted through the first polarizing beam splitter 18 is received by the second light receiving element 34. Here, the phase of the signal photoelectrically converted by the first light receiving element 33 and the phase of the signal photoelectrically converted by the second light receiving element 34 are different from each other by 180 degrees.

The interference signal obtained by the first light receiving element 33 and the second light receiving element 34 is an interference signal expressed by "A cos(Kx+δ)". In this expression, "A" represents the amplitude of the interference signal, and "K" represents wave number which is expressed by "2π/Λ". Further, "x" represents movement amount of the first beam L1 in the diffraction grating 4, and "δ" represents the initial phase. "Λ" represents the grating pitch of the diffraction grating 4.

Here, as shown in FIG. 3, when the member-to-be-measured 9 moves in the height direction by a distance of x/2, the first beam L1 irradiated onto the surface-to-be-measured of the member-to-be-measured 9 will move from the irradiation spot P1 to the irradiation spot P2. Further, the first beam L1 reflected by the member-to-be-measured 9 will move from the diffraction position T1 to a diffraction position T2 on the diffraction grating 4. Here, since the diffraction grating 4 is arranged so that it extends substantially at a right angle with respect to the surface-to-be-measured of the member-to-be-measured 9, the distance between the diffraction position T1 and the diffraction position T2 is x, which is twice as much as the distance between the irradiation spot P1 and the irradiation spot P2. In other words, the movement amount of the first beam L1 on the diffraction grating 4 is x, which is twice as much as the movement amount of the first beam L1 on the member-to-be-measured 9.

Further, since the diffraction grating 4 is arranged so that it extends substantially at a right angle with respect to the surface-to-be-measured of the member-to-be-measured 9, even if the member-to-be-measured 9 is displaced in the height direction, since both the distance of P2-T2 and the distance of P2-P1-T1 are constant, the optical path length of the first beam L1 will always be constant. In other words, the wavelength of the first beam L1 does not change. Further, when the member-to-be-measured 9 is displaced in the height direction, only incident position on the diffraction grating 4 will change.

Thus, a phase increment of Kx is added to the phase of the diffracted first beam L1. In other words, when the member-to-be-measured 9 moves in the height direction by a distance of x/2, the first beam L1 will move on the diffraction grating 4 by a distance of x. Thus, a phase increment of Kx is added to the phase of the first beam L1, and an interfering light that includes one cycle of bright and dark fringes is received by the first light receiving element 33 and the second light receiving element 34.

Here, the interference signal obtained by the first light receiving element 33 and the second light receiving element 34 does not contain component associated with the wavelength of the light source 2. Thus, even if there is the wavelength variation of the light source caused by variation in atmospheric pressure, humidity and temperature, the interference intensity will not be affected by the wavelength variation of the light source.

On the other hand, as shown in FIG. 1, the beam La transmitted through the half mirror 16 is incident on the light receiving side phase plate 17. The beam La, which is formed by the first beam L1 and the second beam L2 (which are linearly polarized lights whose polarization directions are different from each other by 90 degrees), is transmitted through the light receiving side phase plate 17 and thereby become two circularly polarized lights with mutually reversed rotational directions. Further, since the two circularly polarized lights with mutually reversed rotational directions are located in the same optical path, they are superimposed on each other to thereby become linearly polarized light, and such linearly polarized light is incident on the second polarizing beam splitter 19.

The s-polarized component of such linearly polarized light is reflected by the second polarizing beam splitter 19 and received by the third light receiving element 35. Further, the p-polarized component is transmitted through the second polarizing beam splitter 19 and received by the fourth light receiving element 36.

As described above, the linearly polarized light incident on the second polarizing beam splitter 19 is generated by superimposing the two circularly polarized lights with mutually reversed rotational directions on each other. Further, the polarization direction of the linearly polarized light incident on the second polarizing beam splitter 19 rotates ½ revolution every time the member-to-be-measured 9 moves by $\Lambda/2$ in the height direction. Thus, in the same manner, an interference signal expressed by "A cos(Kx+δ')" is obtained by the third light receiving element 35 and the fourth light receiving element 36. Here, "δ'" represents the initial phase.

Further, the phase of the signal photoelectrically converted by the third light receiving element 35 and the phase of the signal photoelectrically converted by the fourth light receiving element 36 are different from each other by 180 degrees.

Incidentally, in the present embodiment, the second polarizing beam splitter 19, which is adapted to split the beams received by the third light receiving element 35 and the fourth light receiving element 36, is disposed at an angle of 45 degrees with respect to the first polarizing beam splitter 18. Thus, the phase of the signals obtained by the third light receiving element 35 and the fourth light receiving element 36 are different from the phase of the signals obtained by the first light receiving element 33 and second light receiving element 34 by 90 degrees.

Thus, it is possible to obtain a Lissajous signal by using the signals obtained by the first light receiving element 33 and second light receiving element 34 as a sine signal, and using the signals obtained by the third light receiving element 35 and fourth light receiving element 36 as a cosine signal.

The signals obtained by these light receiving elements are calculated by the relative position information output section 10, and the amount of displacement of the surface-to-be-measured is counted.

As shown in FIG. 4, for example, in the relative position information output section 10 of the present embodiment, the signal obtained by the first light receiving element 33 and the signal obtained by the second light receiving element 34 whose phases differ from each other by 180 degrees are differential-amplified by the first differential amplifier 61a, so that DC component of the interference signal is cancelled.

Further, such signal is A/D-converted by the first A/D converter 62a, and amplitude, offset and phase of the signal are corrected by the waveform correction processing section 63. In the incremental signal generator 64, such signal is calculated as an A-phase incremental signal, for example.

Similarly, the signal obtained in the third light receiving element 35 and the signal obtained in the fourth light receiving element 36 are differential-amplified by the second differential amplifier 61b and A/D-converted by the second A/D converter 62b. Further, amplitude, offset and phase of the signal are corrected by the waveform correction processing section 63, and the signal is outputted from the incremental signal generator 64 as a B-phase incremental signal whose phase is different from that of the A-phased incremental signal by 90 degrees.

Whether the two phases of the incremental signals obtained in the aforesaid manner are positive or negative is discriminated by a pulse discrimination circuit or the like (not shown in the drawings), and thereby whether the displacement of the member-to-be-measured 9 in the height direction is in positive direction or negative direction can be detected.

Further, it is possible to perform measurement to see how many the aforesaid cycles of the intensity of the interfering light of the first beam L1 and the second beam L2 have changed by counting the number of pulses of the incremental signal with a counter (not shown in the drawings). Thus, the displacement of the member-to-be-measured can be detected by the aforesaid processing.

Incidentally, the relative position information outputted by the relative position information output section 10 of the present embodiment may either be the aforesaid two phases of incremental signals, or be a signal that includes the amount and direction of the displacement calculated based on the two phases of incremental signals.

2. Configuration Example of Member-to-be-Measured

Next, a configuration example of the member-to-be-measured and a modification thereof will be described below with reference to FIG. 5.

Figure 5:
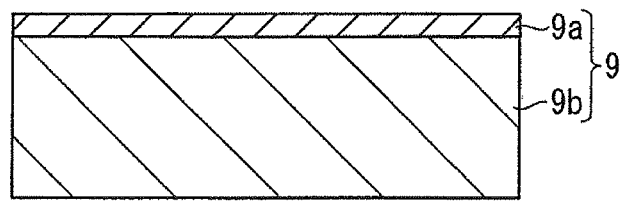
FIG. 5 is a cross-sectional view of a member-to-be-measured of the displacement detecting device according to the first embodiment.

FIG. 5 is a cross-sectional view of the member-to-be-measured.

Typically, a mirror or the like is used as the member-to-be-measured 9 that reflects the light from the light source 2. As shown in FIG. 5, the member-to-be-measured 9 includes a substrate 9b and a reflective film 9a, wherein the reflective film 9a is laminated onto the substrate 9b. The reflective film 9a is machined extremely flat. By flattening the surface, it becomes possible to accurately detect the displacement in the height direction. Further, the reflective film 9a may also be adapted to only reflect the light of specific wavelengths including the wavelength of the light source 2.

3. Displacement Detecting Device According to Second Embodiment

Next, a displacement detecting device 101 according to a second embodiment of the present invention will be described below with reference to FIG. 6.

Figure 6:
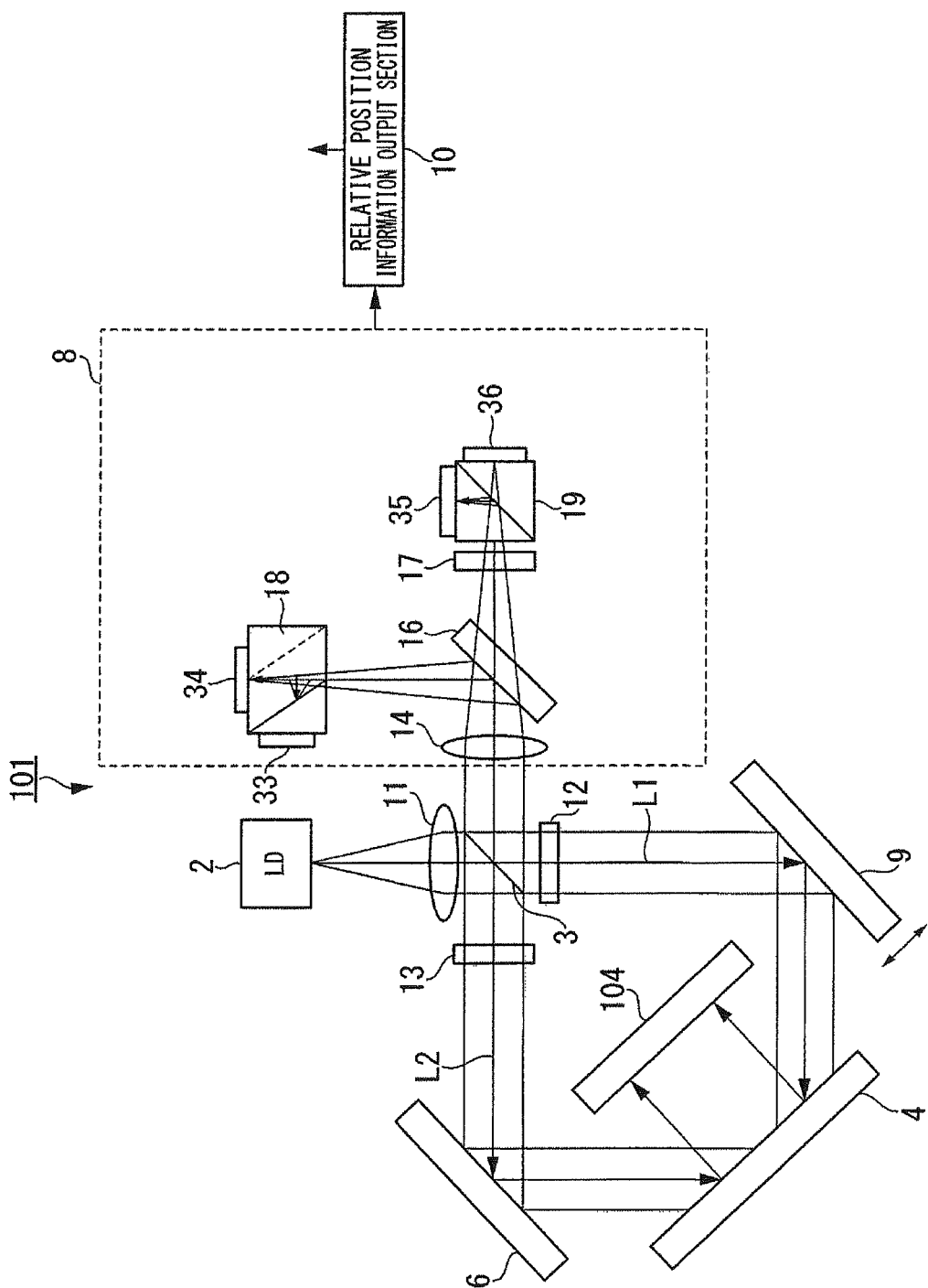
FIG. 6 is a view schematically showing the configuration of a displacement detecting device according to a second embodiment of the present invention.

FIG. 6 is a view schematically showing the configuration of the displacement detecting device 101.

The displacement detecting device 101 of the second embodiment differs from the displacement detecting device 1 of the first embodiment in that the displacement detecting device 101 is provided with a second mirror 104 to second-diffract the first beam L1 and the second beam L2. Thus, hereinafter, only the second mirror 104 will be described, and components common to those of the displacement detecting device 1 of the first embodiment will be denoted by the same reference numerals and the explanation thereof will be omitted.

As shown in FIG. 6, in the displacement detecting device 101, the second mirror 104 is disposed so as to face the diffraction grating 4. Further, the first beam L1 and the second beam L2 first-diffracted by the diffraction grating 4 are irradiated onto the second mirror 104. Further, the second mirror 104 respectively reflects the first-diffracted first beam L1 and second beam L2 to the same points as the diffraction points of the first diffraction. In other words, if the incidence angle on the surface-to-be-measured is θ and the wavelength of the light is λ, the grating pitch Λ of the diffraction grating 4 will be set to a value that satisfies the following Equation 2.

$$\Lambda = \lambda / \sin(\pi/2 - \theta) \quad \text{[Equation 2]}$$

Thus, the first beam L1 and second beam L2 are second-diffracted by the diffraction grating 4 so as to return to the member-to-be-measured 9 and the mirror 6. Incidentally, the optical path length of the first beam L1 from the beam splitting section 3 to the second mirror 104 and the optical path length of the second beam L2 from the beam splitting section 3 to the second mirror 104 are set to be equal to each other.

The configuration of the other portions of the displacement detecting device 101 of the second embodiment is identical to that of the displacement detecting device 1 of the first embodiment, and therefore description thereof is omitted here. With the displacement detecting device 101 having the aforesaid configuration, the same advantages as those of the displacement detecting device 1 of the first embodiment can also be achieved.

Incidentally, with the displacement detecting device 101 according to the second embodiment, since the first beam L1 and the second beam L2 are diffracted twice, the obtained interference signal is expressed as "A cos(2Kx+δ)".

4. Displacement Detecting Device According to Third Embodiment

Next, a displacement detecting device 201 according to a third embodiment of the present invention will be described below with reference to FIG. 7, FIG. 8 and FIG. 9.

Figure 7:
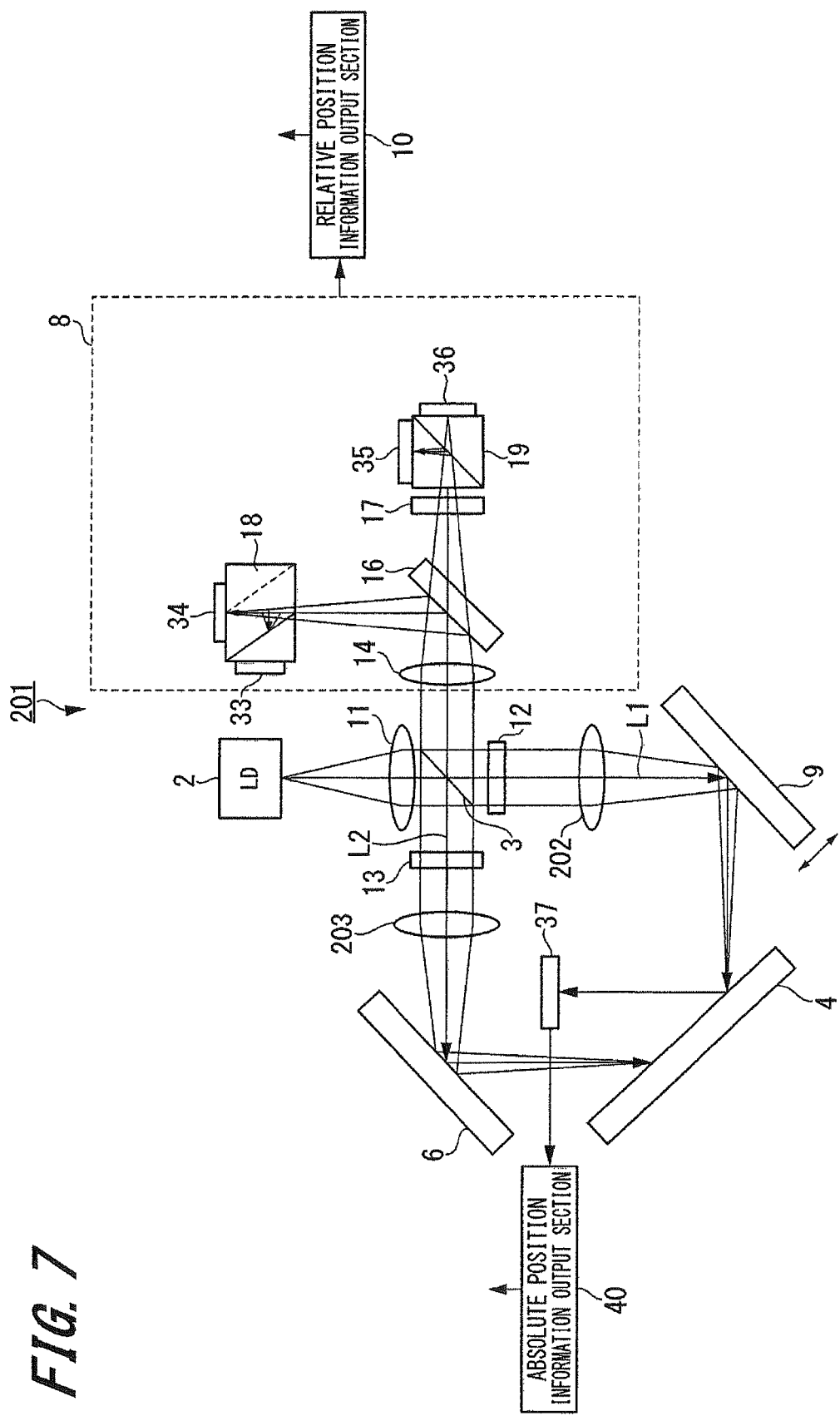
FIG. 7 is a view schematically showing the configuration of a displacement detecting device according to a third embodiment of the present invention.

FIG. 7 is a view schematically showing the configuration of the displacement detecting device 201. FIG. 8 is a view showing an example of an irradiation image irradiated onto a light receiving section for absolute value of the displacement detecting device 201, and FIG. 9 is a view showing the characteristic of a signal obtained based on the light amount detected by the light receiving section for absolute value.

The displacement detecting device 201 of the third embodiment differs from the displacement detecting device 1 of the first embodiment in that in the displacement detecting device 201, a second condensing lens 202 and a third condensing lens 203 are provided and absolute position detection is performed. Thus, hereinafter, only the second condensing lens 202 and the third condensing lens 203 will be described, and components common to those of the displacement detecting device 1 of the first embodiment will be denoted by the same reference numerals and the explanation thereof will be omitted.

As shown in FIG. 7, the second condensing lens 202 for condensing the first beam L1 is disposed between the first phase plate 12 and the member-to-be-measured 9. Further, the third condensing lens 203 for condensing the second beam L2 is disposed between the second phase plate 13 and the mirror 6. The first beam L1 and the second beam L2 are condensed respectively by the second condensing lens 202 and the third condensing lens 203 so as to become convergent light that converges on the diffraction grating 4.

Thus, the amplitude of the interference signal generated when the surface-to-be-measured of the member-to-be-measured 9 is tilted can be prevented from decreasing. Further, the beam diameter irradiated onto the member-to-be-measured 9 may also be adjusted according to the intended use by, for example, condensing the second beam L2 on the member-to-be-measured 9.

Further, a light receiving section for absolute value 37 is disposed so as to face the diffraction grating 4. The light receiving section for absolute value 37 receives the first beam L1 incident on the diffraction grating 4 and reflected by the diffraction grating 4. The light receiving section for absolute value 37 is connected to an absolute position information output section 40.

Figure 8:
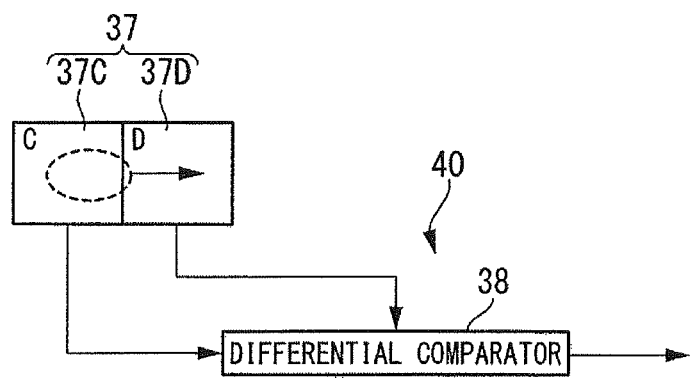
FIG. 8 is a view showing an example of an irradiation image irradiated onto a light receiving section for absolute value of the displacement detecting device according to the third embodiment.
Figure 9:
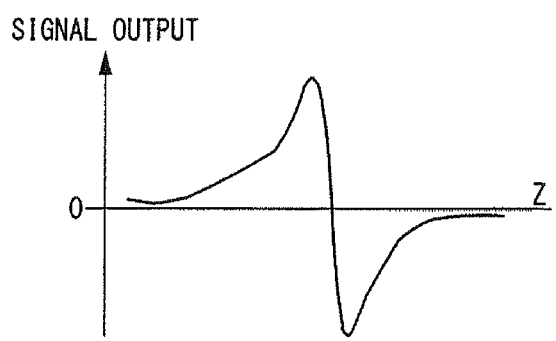
FIG. 9 is a view showing the characteristic of a signal obtained based on the light amount detected by the light receiving section for absolute value of the displacement detecting device according to the third embodiment.

As shown in FIG. 8, the light receiving section for absolute value 37 includes a fifth light receiving element 37C and a sixth light receiving element 37D. The fifth light receiving element 37C and the sixth light receiving element 37D are arranged along a direction in which the reflected light moves (shifts) when the member-to-be-measured 9 is displaced in the height direction. The fifth light receiving element 37C and the sixth light receiving element 37D are connected to a differential comparator 38 that constitutes the absolute position information output section 40.

Further, the fifth light receiving element 37C and the sixth light receiving element 37D convert the detected light into electrical energy (i.e., perform photoelectric conversion) to generate an output signal, and output the output signal to the differential comparator 38.

When the member-to-be-measured 9 is displaced in the height direction, the reflected light of the first beam L1 will be shifted from fifth light receiving element 37C to the sixth light receiving element 37D, for example. When the signal obtained by performing photoelectric conversion passes through the differential comparator 38, a signal output variation shown in FIG. 9 will be obtained. The zero crossing point in the signal output variation shown in FIG. 9 serves as an absolute position, and it is possible to perform absolute position detection of the member-to-be-measured 9 by comparing the absolute position with the relative position information.

The configuration of the other portions of the displacement detecting device 201 of the third embodiment is identical to that of the displacement detecting device 1 of the first embodiment, and therefore description thereof is omitted here. With the displacement detecting device 201 having the aforesaid configuration, the same advantages as those of the displacement detecting device 1 of the first embodiment can also be achieved.

5. Displacement Detecting Device According to Fourth Embodiment

Next, a displacement detecting device 301 according to a fourth embodiment of the present invention will be described below with reference to FIG. 10.

Figure 10:
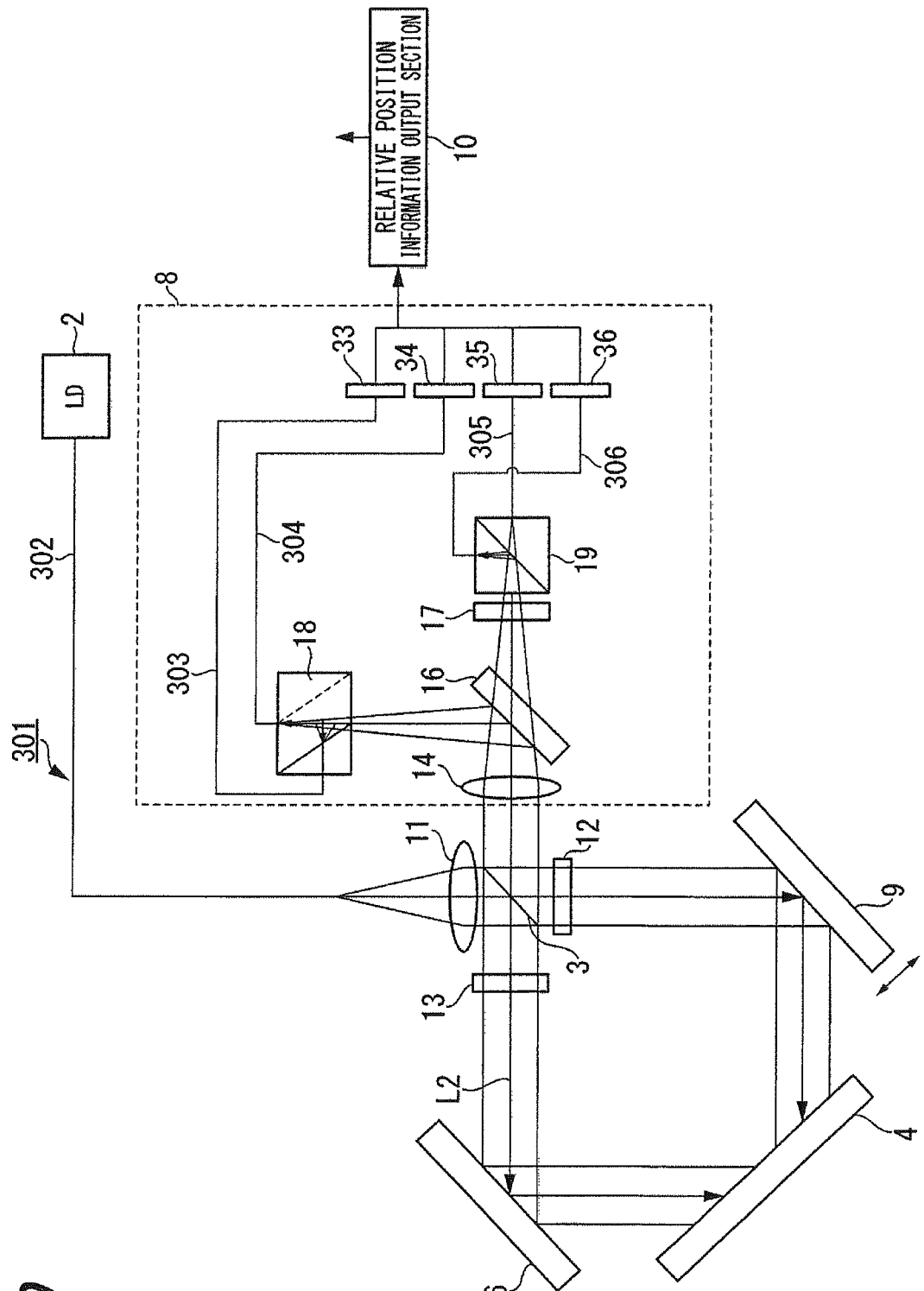
FIG. 10 is a view schematically showing the configuration of a displacement detecting device according to a fourth embodiment of the present invention.

FIG. 10 is a view schematically showing the configuration of the displacement detecting device 301.

The displacement detecting device 301 of the fourth embodiment differs from the displacement detecting device 1 of the first embodiment in that the light source 2 and the light receiving elements 33 to 36 are separated from the other components by employing optical fibers. Thus, hereinafter, only the optical fibers will be described, and components common to those of the displacement detecting device 1 of the first embodiment will be denoted by the same reference numerals and the explanation thereof will be omitted.

As shown in FIG. 10, a light supplying optical fiber 302 is arranged between the light source 2 and the lens 11. The light supplying optical fiber 302 is adapted to supply light from the light source 2 to the lens 11, wherein the light source 2 is arranged outside of the displacement detecting device 301.

The displacement detecting device 301 is provided with a first light receiving optical fiber 302 and a second light receiving optical fiber 303, though which the light is supplied from the first polarizing beam splitter 18 to the first light receiving element 33 and the second light receiving element 34 respectively. Further, the displacement detecting device 301 is provided with a third light receiving optical fiber 305 and a fourth light receiving optical fiber 306, though which the light is supplied from the second polarizing beam splitter 19 to the third light receiving element 35 and the fourth light receiving element 36 respectively.

With such an arrangement, the light source 2, which is a heat source, can be separated from other components. Further, since maintenance of the light source 2 and the first to fourth light receiving elements 33 to 36 can be conducted in a place separated from the displacement detecting device 301, workability can be improved.

Further, by separating the heat source from the displacement detecting device, the temperature of the displacement detecting device is suppressed from rising, and therefore it is possible to perform stable measurement. Furthermore, by bringing the first to fourth light receiving elements 33 to 36 close to the relative position information output section 10, the influence of the exogenous electrical noise can be reduced, and response speed can be increased by optical fiber transmission. In accordance with the intended purpose, it is also possible to only separate the light source 2 from other components by employing an optical fiber or only separate the light receiving elements 33 to 36 from other components by employing optical fibers.

The configuration of the other portions of the displacement detecting device 301 of the fourth embodiment is identical to that of the displacement detecting device 1 of the first embodiment, and therefore description thereof is omitted. With the displacement detecting device 301 having the aforesaid configuration, the same advantages as those of the displacement detecting device 1 of the first embodiment can also be achieved.

6. Displacement Detecting Device According to Fifth Embodiment

Next, a displacement detecting device 401 according to a fifth embodiment of the present invention will be described below with reference to FIG. 11.

Figure 11:
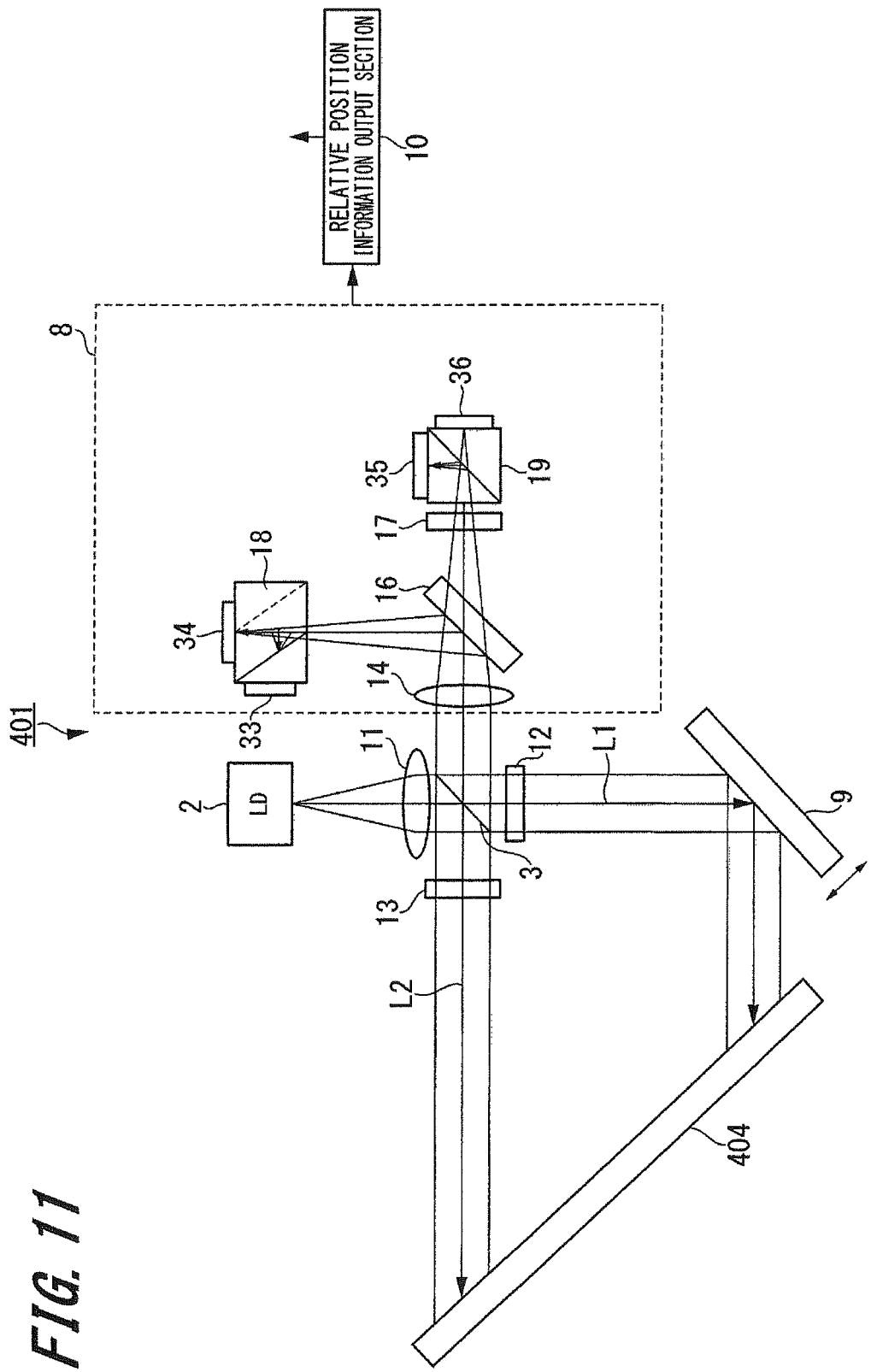
FIG. 11 is a view schematically showing the configuration of a displacement detecting device according to a fifth embodiment of the present invention.

FIG. 11 is a view schematically showing the configuration of the displacement detecting device 401.

The displacement detecting device 401 of the fifth embodiment differs from the displacement detecting device 1 of the first embodiment in that the diffraction grating and the reflecting section are integrated. Thus, only the diffraction grating will be described here, and components common to those of the displacement detecting device 1 of the first embodiment will be denoted by the same reference numerals and the explanation thereof will be omitted.

As shown in FIG. 11, in the displacement detecting device 401 according to the fifth embodiment, the second beam L2 split by the beam splitting section 3 is directly irradiated onto a diffraction grating 404. Further, the diffraction grating 404 reflects the second beam L2 split by the beam splitting section 3 to the beam splitting section 3. In other words, the diffraction grating 404 of the fifth embodiment also plays a role as a reflecting section for reflecting the second beam L2.

Incidentally, the optical path length of the first beam L1 from the beam splitting section 3 to the diffraction grating 404 and the optical path length of the second beam L2 from the beam splitting section 3 to the diffraction grating 404 are set to be equal to each other.

In the displacement detecting device 401 of the fifth embodiment, since the diffraction grating 404 plays a role both as a diffraction section for diffracting the first beam L1 and as a reflecting section for reflecting the second beam L2, the mirror 6 can be eliminated compared with the displacement detecting device 1 of the first embodiment.

The configuration of the other portions of the displacement detecting device 401 of the fifth embodiment is identical to that of the displacement detecting device 1 of the first embodiment, and therefore description thereof is omitted. With the displacement detecting device 401 having the aforesaid configuration, the same advantages as those of the displacement detecting device 1 of the first embodiment can also be achieved.

7. Displacement Detecting Device According to Sixth Embodiment

Next, a displacement detecting device 501 according to a sixth embodiment of the present invention will be described below with reference to FIG. 12.

Figure 12:
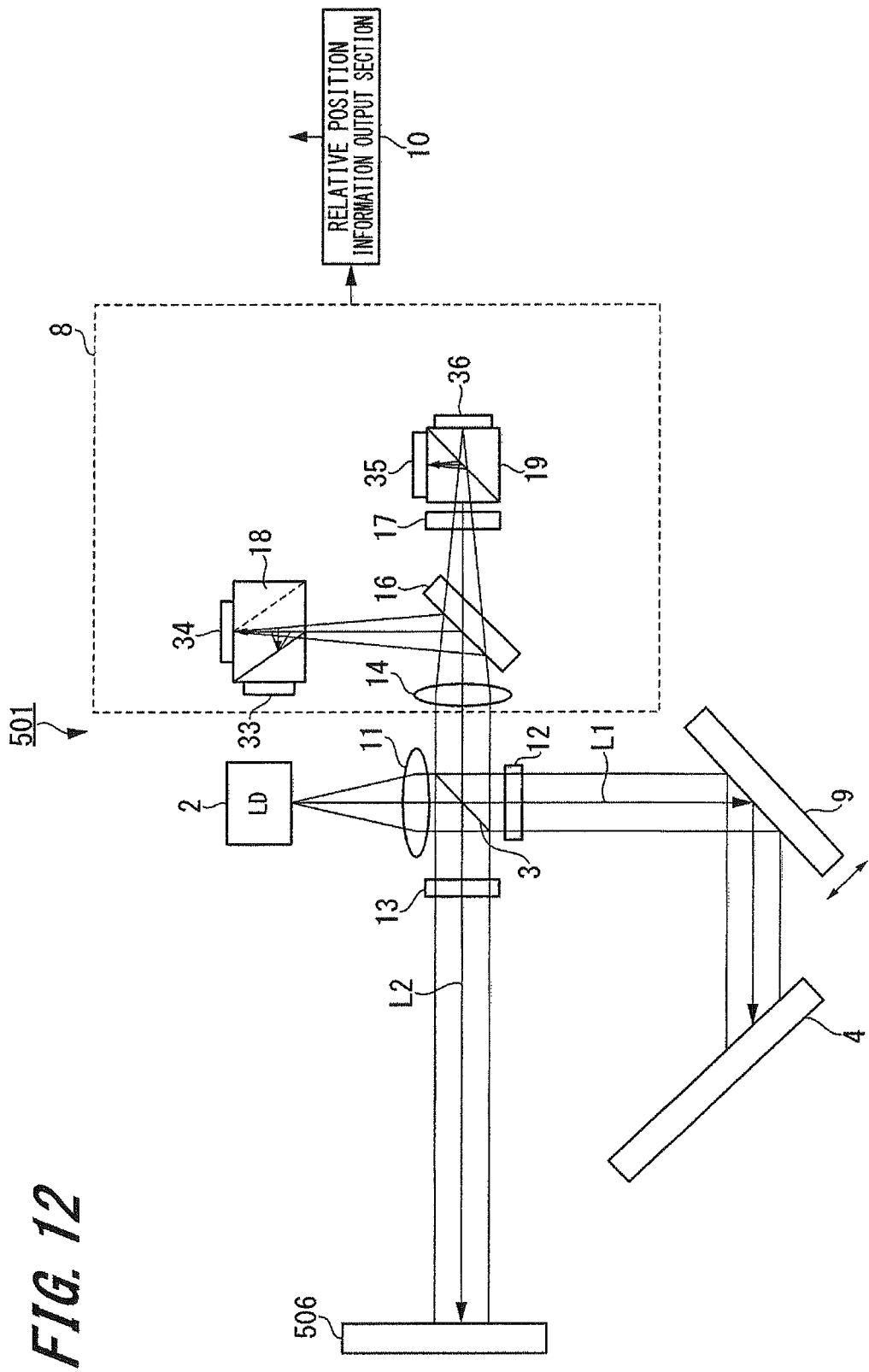
FIG. 12 is a view schematically showing the configuration of a displacement detecting device according to a sixth embodiment of the present invention.

FIG. 12 is a view schematically showing the configuration of the displacement detecting device 501.

The displacement detecting device 501 of the sixth embodiment differs from the displacement detecting device 1 of the first embodiment in that the mirror (which is an example of the reflecting section) of the displacement detecting device 501 has different configuration. Thus, only the mirror will be described here, and components common to those of the displacement detecting device 1 of the first embodiment will be denoted by the same reference numerals and the explanation thereof will be omitted.

As shown in FIG. 12, a mirror 506 (which is an example of the reflecting section) reflects the second beam L2 split by the beam splitting section 3 to the beam splitting section 3 again, without reflecting the second beam L2 to the diffraction grating 4. The mirror 506 is arranged so that the optical path length of the first beam L1 from the beam splitting section 3 to the diffraction grating 4 is equal to the optical path length of the second beam L2 from the beam splitting section 3 to the mirror 506.

The configuration of the other portions of the displacement detecting device 501 of the sixth embodiment is identical to that of the displacement detecting device 1 of the first embodiment, and therefore description thereof is omitted. With the displacement detecting device 501 having the aforesaid configuration, the same advantages as those of the displacement detecting device 1 of the first embodiment can also be achieved.

8. Displacement Detecting Device According to Seventh Embodiment

Next, a displacement detecting device 600 according to a seventh embodiment of the present invention will be described below with reference to FIG. 13.

Figure 13:
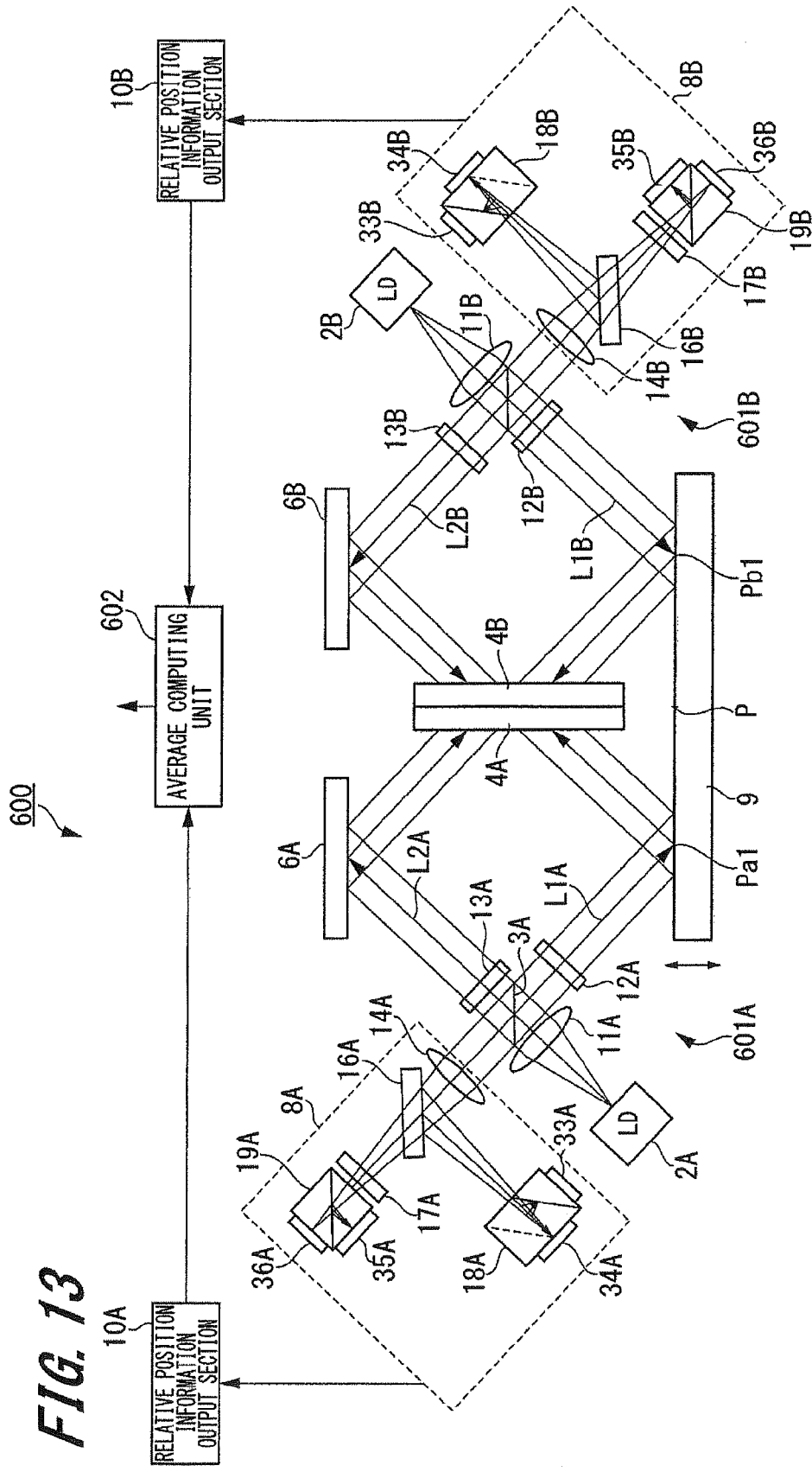
FIG. 13 is a view schematically showing the configuration of a displacement detecting device according to a seventh embodiment of the present invention.
Figure 14:
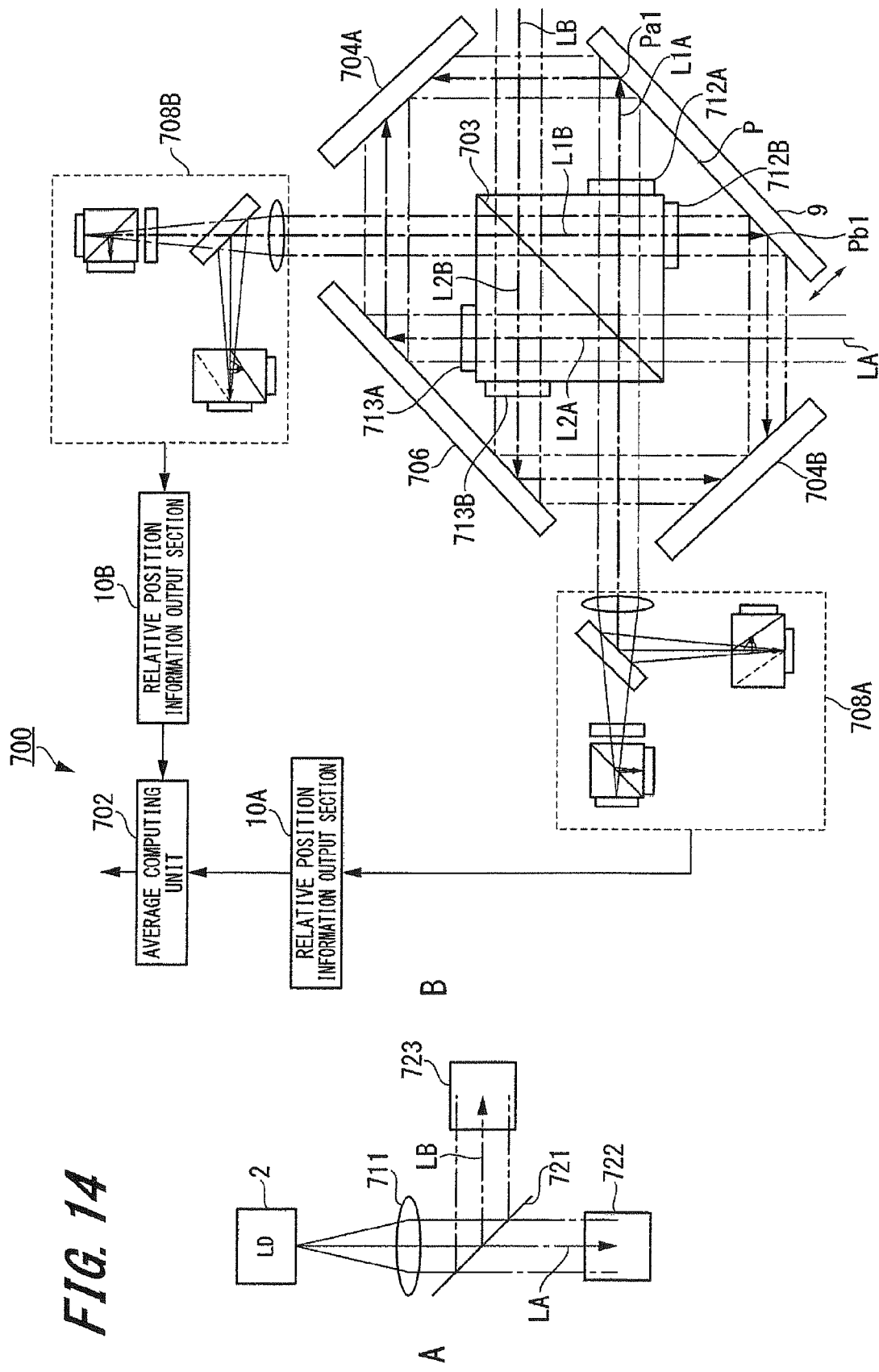
FIG. 14A and FIG. 14B are views schematically showing the configuration of a displacement detecting device according to an eighth embodiment of the present invention.

FIG. 13 is a view schematically showing the configuration of the displacement detecting device 600.

The displacement detecting device 600 of the seventh embodiment is configured by symmetrically arranging two displacement detecting devices 1 of the first embodiment.

As shown in FIG. 13, the displacement detecting device 600 includes a first displacement detecting section 601A, a second displacement detecting section 601B, and an average computing unit 602. The first displacement detecting section 601A and the second displacement detecting section 601B each have the same configuration as that of the displacement detecting device 1 of the first embodiment. Thus, the components constituting the first displacement detecting section 601A are denoted by adding a suffix "A" to the equivalent components of the displacement detecting device 1 of the first embodiment, and the components constituting the second displacement detecting section 601B are denoted by adding a suffix "B" to the equivalent components of the displacement detecting device 1.

The first displacement detecting section 601A irradiates a first beam L1A to an arbitrary first irradiation spot Pa1 on the surface-to-be-measured of the member-to-be-measured 9. The second displacement detecting section 601B irradiates a first beam L1B to an arbitrary second irradiation spot Pb1 on the surface-to-be-measured of the member-to-be-measured 9, wherein the second irradiation spot Pb1 is different from the first irradiation spot Pa1. The displacement detecting device 600 detects the center position between the first irradiation spot Pa1 and the second irradiation spot Pb1 as a virtual point P.

Further, the average computing unit 602 is connected both to a first relative position information output section 10A of the first displacement detecting section 601A and to a second relative position information output section 10B of the second displacement detecting section 601B. The first relative position information output section 10A calculates first relative position information and outputs the calculated first relative position information to the average computing unit 602. Similarly, the second relative position information output section 10B calculates second relative position information and outputs the calculated second relative position information to the average computing unit 602. Further, the average computing unit 602 obtains the average value of the first relative position information and the second relative position information, and outputs the average value as the relative position information of the virtual point P.

In the displacement detecting device 600 of the seventh embodiment, even if the member-to-be-measured 9 is displaced in the height direction, the virtual point P (which is the center position between the first irradiation spot Pa1 and the second irradiation spot Pb1) does not deviate. Thus, it is possible to always detect the same position on the surface-to-be-measured of the member-to-be-measured 9. As a result, even if the surface-to-be-measured of the member-to-be-measured 9 is tilted, the tilt of the surface-to-be-measured can be cancelled by calculating the average value of two points.

Although the seventh embodiment is described based an example in which the displacement detecting device 600 is configured by arranging two displacement detecting devices 1 of the first embodiment, the present invention is not limited to such configuration but includes other configurations in which the displacement detecting device is configured by arranging three or more displacement detecting devices 1. For example, the displacement detecting device may be configured by radially disposing three or more displacement detecting sections with the virtual point P as the center position, and the displacement of the virtual point P (which is the center position) in the height direction can be obtained by averaging the displacements of the displacement detecting sections. Alternatively, the displacement information of the surface-to-be-measured of the member-to-be-measured 9 obtained by three or more displacement detecting sections may be individually calculated respectively to obtain the tilt information of the surface-to-be-measured of the member-to-be-measured 9.

9. Displacement Detecting Device According to Eighth Embodiment

Next, a displacement detecting device 700 according to an eighth embodiment of the present invention will be described below with reference to FIG. 14A and FIG. 14B.

FIG. 14A and FIG. 14B are views schematically showing the configuration of the displacement detecting device 700.

The displacement detecting device 700 according to the eighth embodiment is configured by integrating the beam splitting sections 3A, 3B, the mirrors 6A, 6B (which are the reflecting sections) and the light sources 2A, 2B of the first displacement detecting section 601A and the second displacement detecting section 601B of the displacement detecting device 600 of the seventh embodiment.

As shown in FIG. 14A, the light irradiated from the light source 2 is collimated into parallel light by a lens 711. Further, the parallel light is split into a first light LA and a second light LB by a pre beam splitter 721. The first light LA is reflected by a first reflecting mirror 722 so as to be incident on a beam splitting section 703. Further, the second light LB is reflected by a second reflecting mirror 723 so as to be incident on the beam splitting section 703.

As shown in FIG. 14B, the displacement detecting device 700 includes the beam splitting section 703, four phase plates 712A, 713A, 712B, 713B, a first diffraction grating 704A, a second diffraction grating 704B, a mirror 706, a first light receiving section 708A, and a second light receiving section 708B. Similar to the displacement detecting device 600 of the seventh embodiment, the displacement detecting device 700 includes a first relative position information output section 10A, a second relative position information output section 10B, and an average computing unit 702.

The beam splitting section 703 splits the first light LA into a first beam L1A (which is object light) and a second beam L2A (which is reference light). Further, the beam splitting section 703 splits the second light LB into a first beam L1B (which is object light) and a second beam L2B (which is reference light).

The first beam L1A, which is the light obtained by splitting the first light LA, is transmitted through the first phase plate 712A so as to be irradiated to a first irradiation spot Pa1 on the member-to-be-measured 9. Further, the first beam L1A is reflected by the member-to-be-measured 9 so as to be irradiated onto the first diffraction grating 704A. In contrast, the first beam L1B, which is the light obtained by splitting the second light LB, is transmitted through the third phase plate 712B so as to be irradiated to a second irradiation spot Pb1 on the member-to-be-measured 9. Further, the first beam L1A is reflected by the member-to-be-measured 9 so as to be irradiated onto the second diffraction grating 704B.

Further, the second beam L2A, which is the light obtained by splitting the first light LA, is transmitted through the second phase plate 713A so as to be irradiated onto the mirror 706. Further, the second beam L2A reflected by the mirror 706 is incident on the first diffraction grating 704A. In contrast, the second beam L2B, which is the light obtained by splitting the second light LB, is transmitted through the fourth phase plate 713B so as to be irradiated onto the mirror 706. Further, the second beam L2B reflected by the mirror 706 is incident on the second diffraction grating 704B.

Further, the first beam L1A and the second beam L2A, which are two beams obtained by splitting the first light LA, are incident on the first light receiving section 708A. Further, the first beam L1B and the second beam L2B, which are two beams obtained by splitting the second light LB, are incident on the second light receiving section 708B.

The configuration of the other portions of the displacement detecting device 700 of the eighth embodiment is identical to that of the displacement detecting device 600 of the seventh embodiment, and therefore description thereof is omitted. With the displacement detecting device 700 having the aforesaid configuration, the same advantages as those of the displacement detecting device 600 of the seventh embodiment can also be achieved.

Further, with displacement detecting device 700 of the eighth embodiment, by sharing the light source 2, the influence of wavelength variation and the like caused by deterioration of the light source 2 can be cancelled by the average computing unit 702.

Next, a method of splitting the light of the displacement detecting device having a plurality of displacement detecting sections will be described below with reference to FIG. 15.

Figure 15:
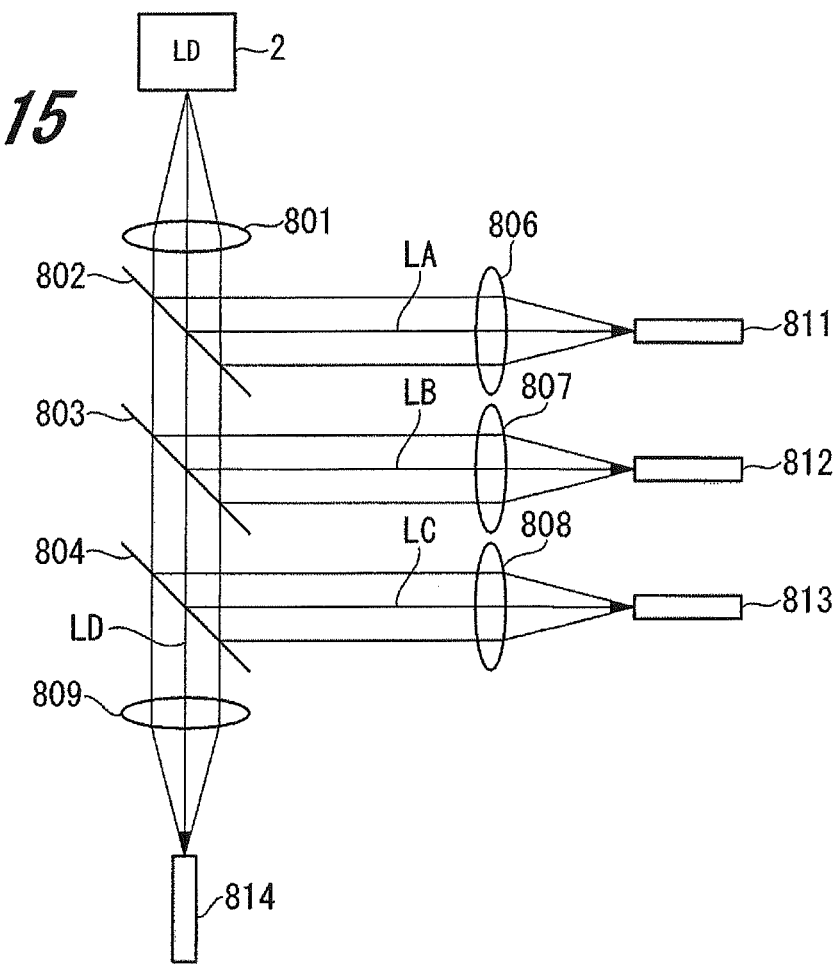
FIG. 15 is a view schematically showing the configuration around a light source of a displacement detecting device having a plurality of displacement detecting sections.

FIG. 15 is a view schematically showing the configuration around the light source of a displacement detecting device having a plurality of displacement detecting sections.

As shown in FIG. 15, the light irradiated from the light source 2 is collimated into parallel light by a lens 801. A plurality of beam splitters 802, 803, 804 are provided. The light irradiated from the light source 2 is split into a first light LA, a second light LB, a third light LC and a fourth light LD by the plurality of beam splitters 802, 803, 804. The first light LA is condensed by a condensing lens 806 and irradiated to a first optical fiber 811. Similarly, the second light LB, the third light LC and the fourth light LD are respectively condensed by three condensing lenses 807, 808, 809 and respectively irradiated to three optical fibers 812, 813, 814.

In such manner, by splitting the light of one light source 2 into a plurality of lights and supplying the plurality of lights to the respective displacement detecting sections, variation in temperature and variation in long-term property of the light source 2 can be shared by the plurality of displacement detecting sections. Thus, even if a plurality of displacement detecting sections are provided, it is also possible to eliminate the individual variability of the plurality of displacement detecting sections.

10. Displacement Detecting Device According to Ninth Embodiment

Next, a displacement detecting device 1001 according to a ninth embodiment of the present invention will be described below with reference to FIG. 16, FIG. 17, FIG. 18A and FIG. 18B.

Figure 16:
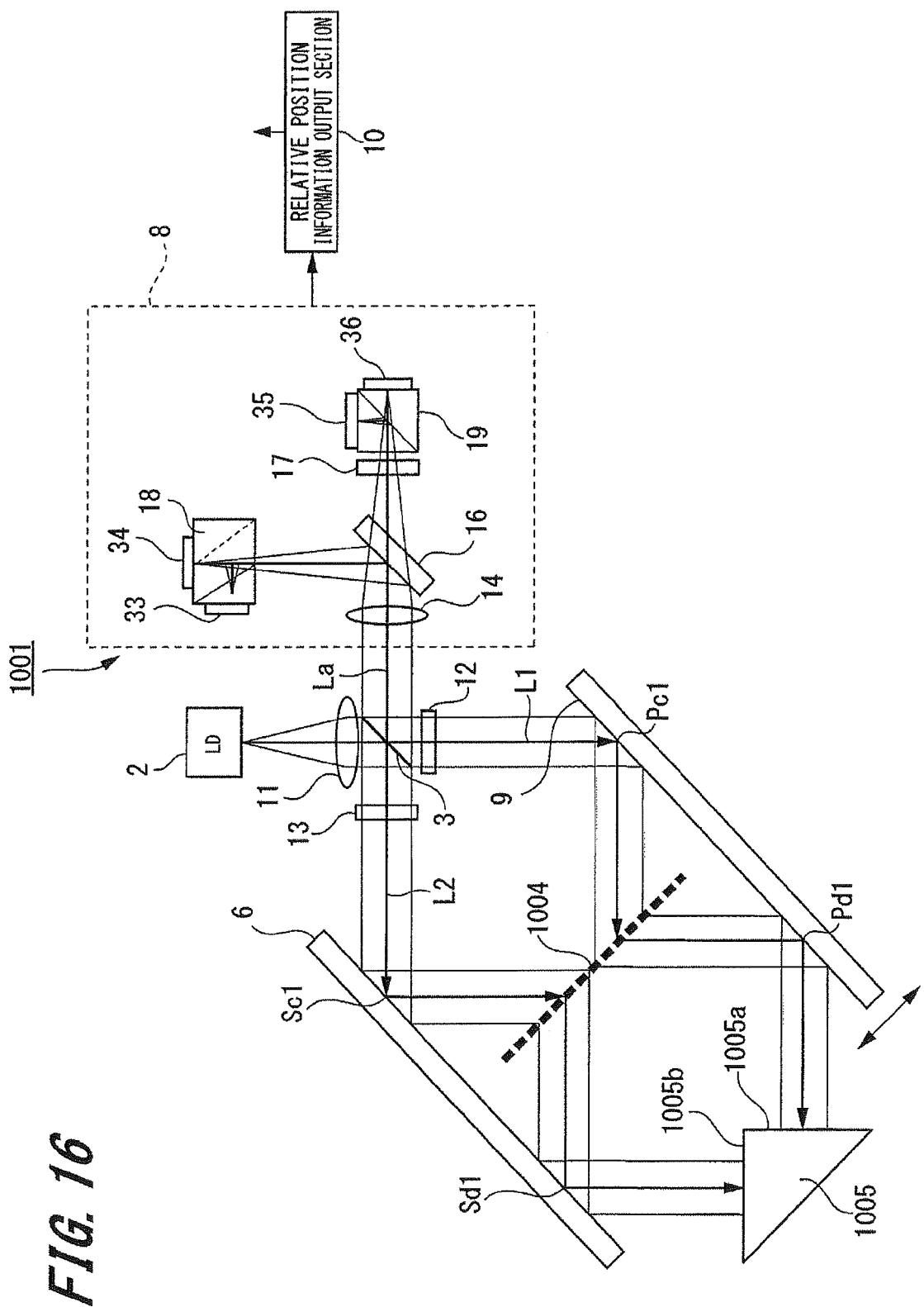
FIG. 16 is a view schematically showing the configuration of a displacement detecting device according to a ninth embodiment of the present invention.
Figure 17:
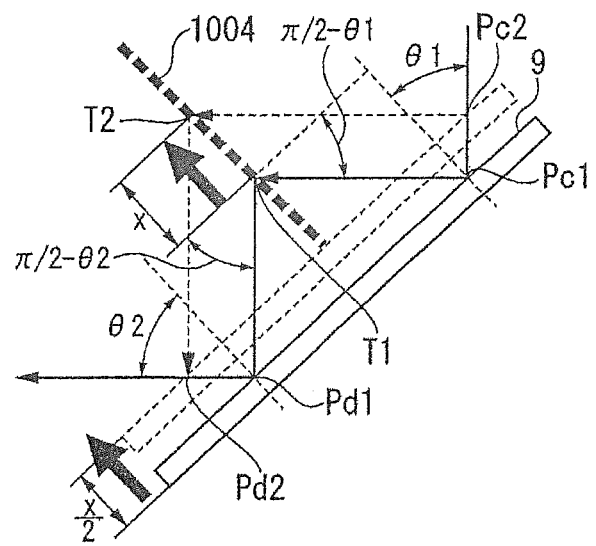
FIG. 17 is a view for explaining a primary portion of the displacement detecting device according to the ninth embodiment.
Figure 18A:
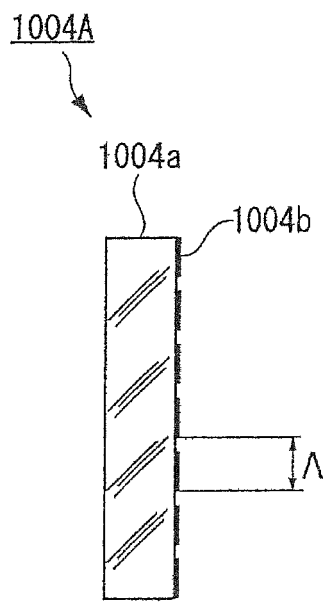
Figure 18B:
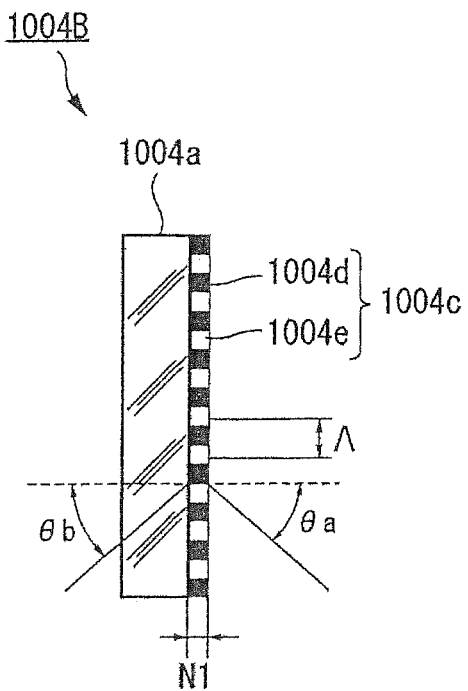

FIG. 16 is a view schematically showing the configuration of the ninth embodiment, FIG. 17 is a view for explaining a primary portion of the ninth embodiment, FIG. 18A and FIG. 18B are views showing examples of a diffraction grating of the ninth embodiment.

In contrast to the displacement detecting device 1 of the first embodiment in which the reflective diffraction grating 4 is used, in the displacement detecting device 1001 of the ninth embodiment, a transmissive diffraction grating is used. Thus, hereinafter, components common to those of the displacement detecting device 1 of the first embodiment will be denoted by the same reference numerals and the explanation thereof will be omitted.

As shown in FIG. 16, the displacement detecting device 1001 includes a light source 2, a beam splitting section 3, a transmissive diffraction grating 1004, a mirror 6, a light receiving section 8, a relative position information output section 10, and a return reflecting mirror 1005 (which is a return reflecting section). Further, a first phase plate 12 is arranged between the beam splitting section 3 and the member-to-be-measured 9, and a second phase plate 13 is arranged between the beam splitting section 3 and the mirror 6.

The light emitted from the light source 2 is split into a first beam L1 and a second beam L2 by the beam splitting section 3. The first beam L1 is incident at a first irradiation spot Pc1 on the surface-to-be-measured of the member-to-be-measured 9. The member-to-be-measured 9 reflects the first beam L1 incident at the first irradiation spot Pc1 to the diffraction grating 1004.

Further, the mirror 6 is disposed so as to face the diffraction grating 9. The second beam L2 split by the beam splitting section 3 is irradiated onto the mirror 6. The second beam L2 is incident at a reflection-side first irradiation spot Sc1 on the reflecting surface of the mirror 6. Similar to the member-to-be-measured 9, the mirror 6 reflects the second beam L2 incident thereon to the diffraction grating 1004.

The diffraction grating 1004 is a transmissive diffraction grating that transmits and diffracts the light incident thereon. The first beam L1 transmitted through and first-diffracted by the diffraction grating 1004 is incident at a second irradiation spot Pd1 on the surface-to-be-measured of the member-to-be-measured 9, wherein the second irradiation spot Pd1 is different from the first irradiation spot Pc1. Further, the first beam L1 first-diffracted by the diffraction grating 1004 and incident at the second irradiation spot Pd1 is reflected to the return reflecting mirror 1005 by the member-to-be-measured 9.

Similarly, the second beam L2 transmitted through and first-diffracted by the diffraction grating 1004 is incident at a reflection-side second irradiation spot Sd1 on the reflecting surface of the mirror 6, wherein the reflection-side second irradiation spot Sd1 is different from the reflection-side first irradiation spot Sc1. The second beam L2 first-diffracted by the diffraction grating 1004 and incident at the reflection-side second irradiation spot Sd1 is reflected to the return reflecting mirror 1005 by the mirror 6.

Further, similar to the diffraction grating 4 of the first embodiment, the diffraction grating 1004 is arranged so that it extends substantially at a right angle with respect to the surface-to-be-measured of the member-to-be-measured 9 (i.e., the angle between the diffraction surface of the diffraction grating 1004 and the surface-to-be-measured of the member-to-be-measured 9 is substantially 90°).

The return reflecting mirror 1005 is a substantially triangular mirror having a first reflecting surface 1005a and a second reflecting surface 1005b. The first beam L1 reflected by the member-to-be-measured 9 is incident on the first reflecting surface 1005a, and the second beam L2 reflected by the mirror 6 is incident on the second reflecting surface 1005b. The return reflecting mirror 1005 returns the first beam L1 and the second beam L2 back to the member-to-be-measured 9 and the mirror 6 along the same optical path as that along which the first beam L1 and the second beam L2 were incident on the return reflecting mirror 1005.

The return reflecting mirror 1005 is arranged so that the optical path length of the first beam L1 is equal to the optical path length of the second beam L2. Due to the provision of the return reflecting mirror 1005, when producing the displacement detecting device 1001, it becomes easy to adjust the optical path length of the first beam L1, the optical path length of the second beam L2, and the angle of the optical axis. As a result, it is possible to make it less susceptible to the influence of the wavelength variation of the light source 2 caused by variation in atmospheric pressure, humidity and temperature.

Further, the first beam L1 returned back to the member-to-be-measured 9 by the return reflecting mirror 1005 is reflected at the second irradiation spot Pb1 of the member-to-be-measured 9 and incident again on the diffraction grating 1004. Further, the first beam L1 is second-diffracted by the diffraction grating 1004. The second-diffracted first beam L1 is reflected by the member-to-be-measured 9 so as to return to the beam splitting section 3. Similar to the first beam L1, the second beam L2 is also returned back to the beam splitting section 3 through the diffraction grating 1004 and the mirror 6.

Although the present embodiment is described based on an example in which the first phase plate 12 is arranged between the beam splitting section 3 and the member-to-be-measured 9, and the second phase plate 13 is arranged between the beam splitting section 3 and the mirror 6, the present invention is not limited to such example. For example, the present invention also includes a configuration in which the first phase plate 12 is arranged on the first reflecting surface 1005a of the return reflecting mirror 1005, and the second phase plate 13 is arranged on the second reflecting surface 1005b of the return reflecting mirror 1005.

Here, a primary portion of the displacement detecting device 1001 of the ninth embodiment will be described below with reference to FIG. 17.

As shown in FIG. 17, the diffraction grating 1004 is disposed so as to be substantially perpendicular to the member-to-be-measured 9. Thus, the first beam L1 incident at the first irradiation spot Pc1 of the member-to-be-measured 9 at an incidence angle θ1 is incident on the diffraction grating 1004 at an incidence angle π/2−θ1. Further, the first beam L1 is incident at the second irradiation spot Pb1 of the member-to-be-measured 9 at an incidence angle θ2.

It is preferred that the grating pitch Λ of the diffraction grating 1004 is set so that the diffraction angle is substantially equal to the incidence angle on the diffraction grating 1004. In other words, if the first incidence angle on the surface-to-be-measured is θ1, the second incidence angle on the surface-to-be-measured is θ2, and the wavelength of the light is λ, then the grating pitch Λ of the diffraction grating 1004 satisfies the following Equation 3.

$$\Lambda = n\lambda / (\sin(\pi/2 - \theta 1) + \sin(\pi/2 - \theta 2))$$

Where "n" represents a positive integer.

In the case where the diffraction angle is equal to the incidence angle on the diffraction grating 1004, it is possible to obtain a configuration in which the first irradiation spot Pc1 and the second irradiation spot Pd1 are symmetric with respect to the diffraction grating 1004. Equation 3 may also be expressed as the following Equation 4.

$$2\Lambda \sin \theta = n\lambda \quad \text{[Equation 4]}$$

Where "θ" represents the diffraction angle and the incidence angle on the diffraction grating 1004.

In other words, it is possible to satisfy the Bragg condition, and therefore it is possible to strengthen the diffracted light diffracted by the diffraction grating 1004.

As described above, the first beam L1 incident on the member-to-be-measured 9 at angle θ2 is reflected by the member-to-be-measured 9 and incident on the return reflecting mirror 1005 (see FIG. 16). Further, the first beam L1 incident on the return reflecting mirror 1005 is reflected by the first reflecting surface 1005a of the return reflecting mirror 1005 and incident again at the second irradiation spot Pd1 of the member-to-be-measured 9 at an incidence angle 82 along the same optical path as the advancing optical path.

Further, the first beam L1 reflected by the member-to-be-measured 9 is incident again on the diffraction grating 1004 at angle π/2−θ2. Incidentally, the second diffraction of the first beam L1 is performed at a diffraction angle of π/2−θ1 according to the condition expressed by Equation 2. Further, the first beam L1 diffracted by the diffraction grating 1004 is incident again at the first irradiation spot Pc1 on the member-to-be-measured 9 at an incidence angle θ1. Thus, the optical path of the first beam L1 reflected back by the member-to-be-measured 9 is superimposed on the advancing optical path of the first beam L1 split by the beam splitting section 3.

Further, as shown in FIG. 17, when the member-to-be-measured 9 moves in the height direction by a distance of x/2, the first beam L1 irradiated onto the surface-to-be-measured of the member-to-be-measured 9 will move from the first irradiation spot Pc1 to a first irradiation spot Pc2. Further, the first beam L1 reflected by the first irradiation spots Pc1, Pc2 of the member-to-be-measured 9 will move from a diffraction position T1 to a diffraction position T2 on the diffraction grating 1004. Further, the first beam L1 first-diffracted by the diffraction grating 1004 moves from the second irradiation spot Pd1 to a second irradiation spot Pd2 on the member-to-be-measured 9.

Here, since the diffraction grating 1004 is arranged so that it extends substantially at a right angle with respect to the surface-to-be-measured of the member-to-be-measured 9, the distance between the diffraction position T1 and the diffraction position T2 is x, which is twice as much as the distance between the first irradiation spot Pc1 and the first irradiation spot Pc2. In other words, the movement amount of the first beam L1 on the diffraction grating 1004 is x, which is twice as much as the movement amount of the first beam L1 on the member-to-be-measured 9.

Further, since the diffraction grating 1004 is arranged so that it extends substantially at a right angle with respect to the surface-to-be-measured of the member-to-be-measured 9, even if the member-to-be-measured 9 is displaced in the height direction, the optical path length of the first beam L1 will always be constant. In other words, the wavelength of the first beam L1 will not change. Further, when the member-to-be-measured 9 is displaced in the height direction, only the incident position on the diffraction grating 1004 will change.

Incidentally, the circumstance of the second beam L2 irradiated onto the mirror 6 is identical to that of the first beam L1, and therefore the description of the second beam L2 will be omitted.

In the displacement detecting device 1001 of the ninth embodiment, the first beam L1 is diffracted twice. Thus, a phase increment of 2Kx is added to the phase of the first beam L1 having been diffracted twice. "K" represents wave number which is expressed by "2π/Λ". Further, "x" represents movement amount of the first beam L1 in the diffraction grating 1004. In other words, when the member-to-be-measured 9 moves in the height direction by a distance of x/2, the first beam L1 will move on the diffraction grating 4 by a distance of x, which is twice as much as the movement distance of the member-to-be-measured 9 in the height direction. Further, by diffracting the first beam L1 twice, a phase increment of 2Kx is added to the phase of the first beam L1, and an interfering light that includes two cycles of bright and dark fringes is received by the light receiving section 8.

In other words, an interference signal expressed by "A cos(2Kx+δ)" can be obtained by the first light receiving element 33 and the second light receiving element 34. Further, an interference signal expressed by "A cos(2Kx+δ')" can be obtained by the third light receiving element 35 and the fourth light receiving element 36.

Thus, with the displacement detecting device 1001 of the ninth embodiment, in the case where the grating pitch of the diffraction grating 1004 is equal to the grating pitch of the diffraction grating 4 of the first embodiment, a resolution twice as high as that of the displacement detecting device 1 of the first embodiment can be achieved.

Described below is an example in which the member-to-be-measured 9 moves in the height direction by a distance of 0.5515 μm in the case where the grating pitch Λ of the diffraction grating 1004 is set to 0.5515 μm, the wavelength λ is set to 780 nm, and the incidence angle and the diffraction angle of the diffraction grating 1004 are set to 45 degrees.

When the member-to-be-measured 9 moves in the height direction by a distance of 0.5515 μm, the first beam L1 will move on the diffraction grating 1004 by a distance twice as much as 0.5515 μm, which is equivalent to two pitches. Further, since the first beam L1 is diffracted twice, an interfering light that includes four bright and dark fringes can be received by the light receiving section 8. In other words, one cycle of the obtained signal becomes 0.5515 μm/4 (=0.1379 μm).

Further, in the displacement detecting device 1001 of the ninth embodiment, two points (i.e., the first irradiation spot Pc1 and the second irradiation spot Pd1) on the member-to-be-measured 9 are irradiated by the first beam L1 with one optical system. Thus, it is possible to use one optical system to cancel measurement point, similar to the displacement detecting device 600 of the seventh embodiment and the displacement detecting device 700 of the eighth embodiment.

Further, by configuring the displacement detecting device in the above manner, even if the surface-to-be-measured of the member-to-be-measured 9 is tilted, since the first beam L1 is irradiated to the first irradiation spot Pc1 and irradiated to the second irradiation spot Pd1, the tilt of the surface-to-be-measured can be cancelled. Thus, variation in optical path length of the first beam L1 is less likely to be caused, and difference between the optical path length of the first beam L1 and the optical path length of the second beam L2 can be reduced.

Next, examples of the diffraction grating used in the displacement detecting device 1001 of the ninth embodiment will be described below with reference to FIGS. 18A and 18B.

FIG. 18A is a cross-sectional view of an example of the diffraction grating, and FIG. 18B is a cross-sectional view of another example of the diffraction grating.

A diffraction grating 1004A shown in FIG. 18A is configured by forming a grating portion 1004b on a surface of a substantially transparent glass substrate 1004a, wherein the grating portion 1004b is formed of chromium (Cr), for example. Since the grating portion 1004b is typically formed by vacuum-depositing a chromium film or the like on one surface of the glass substrate 1004a, the thickness of the grating portion 1004b is 1 μm or less.

A diffraction grating 1004B shown in FIG. 18B is a so-called hologram that uses a photographic plate. Described below is a phase hologram, although an absorption hologram may also be used. A grating portion 1004c of the diffraction grating 1004B is formed by the following steps, for example. First, a light-sensitive silver salt emulsion is coated on one surface of the glass substrate 1004a, exposed to interference fringes, developed, and then bleached. Thus, places with silver particles remaining thereon 1004d and places with no silver particle remaining thereon 1004e are formed in the grating portion 1004c. Here, the places with silver particles remaining thereon 1004d have higher refractive index, and the places with no silver particle remaining thereon 1004e have lower refractive index. In other words, a phase hologram is formed. Further, as material, a photopolymer for hologram recording may also be used instead of the photographic plate.

In the case where the diffraction grating 1004B having the aforesaid configuration is used, when the light is incident at a predetermined angle (incidence angle) 8a, the light will be outputted (i.e., diffracted) at a predetermined angle (i.e., diffraction angle) θb. Further, when the Bragg condition expressed as Equation 3 is satisfied, the output of the diffracted light diffracted by the diffraction grating 1004B can be maximized. In other words, the amount of light diffracted by the diffraction grating 1004B can be prevented from decreasing.

Further, in the case where it is desired to perform a plurality of diffraction (like the displacement detecting device 1001 of the ninth embodiment) wherein then incidence angle is equal to the diffraction angle, it is preferred that the diffraction grating 1004B, which has good diffraction efficiency, shown in FIG. 18B is used.

It is preferred that the thickness N1 of the grating portion 1004c of the diffraction grating 1004B is four times or more as large as the grating pitch Λ. However, considering that the light will be absorbed by the grating portion 1004c, it is preferred that the thickness N1 of the grating portion 1004c is set to 4 to 20 times as large as the grating pitch Λ.

The configuration of the other portions of the displacement detecting device 1001 of the ninth embodiment is identical to that of the displacement detecting device 1 of the first embodiment, and therefore description thereof is omitted. With the displacement detecting device 1001 having the aforesaid configuration, the same advantages as those of the displacement detecting device 1 of the first embodiment can also be achieved.

11. Displacement Detecting Device According to Tenth Embodiment

Next, a displacement detecting device 1201 according to a tenth embodiment of the present invention will be described below with reference to FIG. 19.

Figure 19:
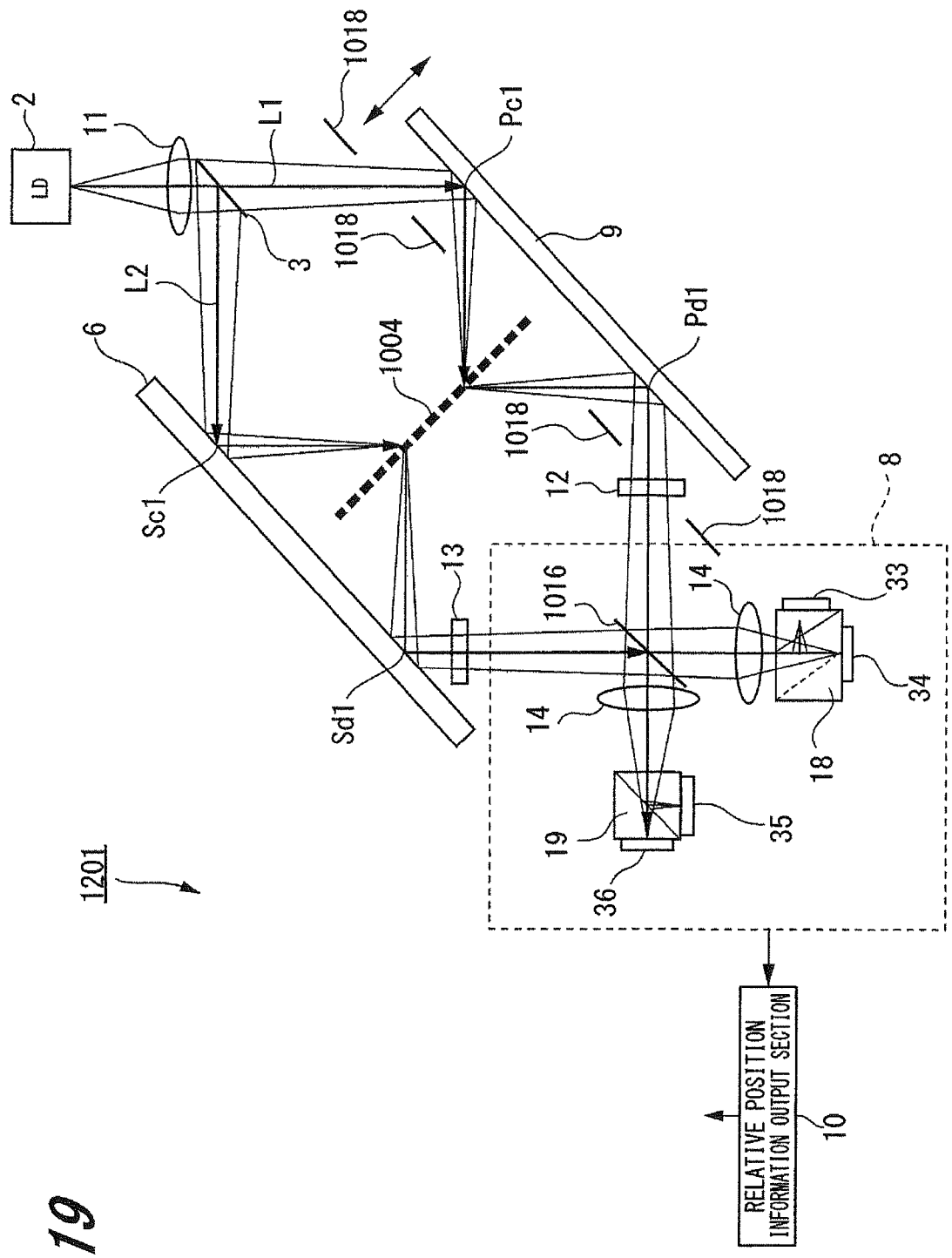
FIG. 19 is a view schematically showing the configuration of a displacement detecting device according to a tenth embodiment of the present invention.

FIG. 19 is a view schematically showing the configuration of the displacement detecting device 1201 according to the tenth embodiment.

As shown in FIG. 19, similar to the displacement detecting device 1001 of the ninth embodiment, a transmissive diffraction grating 1004 is used in the displacement detecting device 1201 of the tenth embodiment. The displacement detecting device 1201 of the tenth embodiment differs from the displacement detecting device 1001 of the ninth embodiment in that the first beam L1 and the second beam L2 are not returned to the advancing optical path. Thus, components common to those of the displacement detecting device 1001 of the ninth embodiment will be denoted by the same reference numerals and the explanation thereof will be omitted.

As shown in FIG. 19, unlike the displacement detecting device 1001 of the ninth embodiment, the displacement detecting device 1201 of the tenth embodiment is not provided with the return reflecting mirror 1005 (which is a return reflecting section). Thus, the first beam L1 first-diffracted by the diffraction grating 1004 is reflected by the member-to-be-measured 9 so as to be incident on a light-combining section 1016. Further, the second beam L2 first-diffracted by the diffraction grating 1004 is reflected by the mirror 6 so as to be incident on the light-combining section 1016.

The light-combining section 1016 is configured by, for example, a half mirror, a beam splitter or the like. The light-combining section 1016 superimposes the first beam L1 and the second beam L2 on each other, and splits the superimposed beam into two beams. The beams split by the light-combining section 1016 are condensed by two condensing lenses 14 and incident on the first polarizing beam splitter 18 and the second polarizing beam splitter 19.

Here, the optical path length of the first beam L1 from the beam splitting section 3 to the diffraction grating 1016 and the optical path length of the second beam L2 from the beam splitting section 3 to the diffraction grating 1016 are set to be substantially equal to each other. Thus, similar to the displacement detecting devices of the other embodiments, in the displacement detecting device 1201 of the tenth embodiment, even if there is wavelength variation of the light source caused by variation in atmospheric pressure, humidity and temperature, it is possible to make the first beam L1 and the second beam L2 to be equally affected by the wavelength variation. As a result, regardless of ambient environment, it is possible to perform stable measurement without performing atmospheric pressure correction, humidity correction and temperature correction.

Further, a first phase plate 12 is arranged between the light-combining section 1016 and the member-to-be-measured 9, and a second phase plate 13 is arranged between the light-combining section 1016 and the mirror 6. The first beam L1 is converted into circularly polarized light by the first phase plate 12. Further, the second beam L2 is converted into circularly polarized light by the second phase plate 13, where in the circularly polarized light of the second beam L2 and the circularly polarized light of the first beam L1 have mutually reversed rotational directions.

Incidentally, in the displacement detecting device 1201 of the tenth embodiment, the first beam L1 and the second beam L2 are diffracted only once by the diffraction grating 1004. Thus, unlike the displacement detecting device 1001 of the ninth embodiment wherein the first beam L1 and the second beam L2 are diffracted twice, in the displacement detecting device 1201 of the tenth embodiment, when the member-to-be-measured 9 moves in the height direction by a distance of x/2, a phase increment of Kx will be added to the phase of the first beam L1.

Further, in the displacement detecting device 1201 of the tenth embodiment, the first beam L1 and the second beam L2 are not returned back to the beam splitting section 3 through the member-to-be-measured 9 and the mirror 6. Thus, it is not necessary to consider the polarization direction when the first beam L1 and the second beam L2 are returned. As a result, it is possible to freely set the polarization direction of the first beam L1 split by the beam splitting section 3 and incident on the member-to-be-measured 9 according to the condition of the member-to-be-measured 9.

In other words, as described later, when a diffraction grating scale is used as the member-to-be-measured 9 and the displacement detecting device 1201 and other displacement detecting device(s) are used in combination, it is possible to change the polarization direction at the time when light is incident on the member-to-be-measured 9 according to intended purpose.

Further, the displacement detecting device 1201 of the tenth embodiment is provided with a light-blocking plate 1018 which is arranged so as to face the surface-to-be-measured of the member-to-be-measured 9. Due to the provision of the light-blocking plate 1018, in the case where the member-to-be-measured 9 is a diffraction grating scale, specific diffracted light diffracted by the member-to-be-measured 9 can be prevented from entering the displacement detecting device 1201 as stray light.

The configuration of the other portions of the displacement detecting device 1201 of the tenth embodiment is identical to those of the displacement detecting device 1 of the first embodiment and the displacement detecting device 1001 of the ninth embodiment, and therefore description thereof is omitted. With the displacement detecting device 1201 having the aforesaid configuration, the same advantages as those of the displacement detecting device 1 of the first embodiment and the displacement detecting device 1001 of the ninth embodiment can also be achieved.

12. Displacement Detecting Device According to Eleventh Embodiment

Next, a displacement detecting device 1301 according to an eleventh embodiment of the present invention will be described below with reference to FIG. 20.

Figure 20:
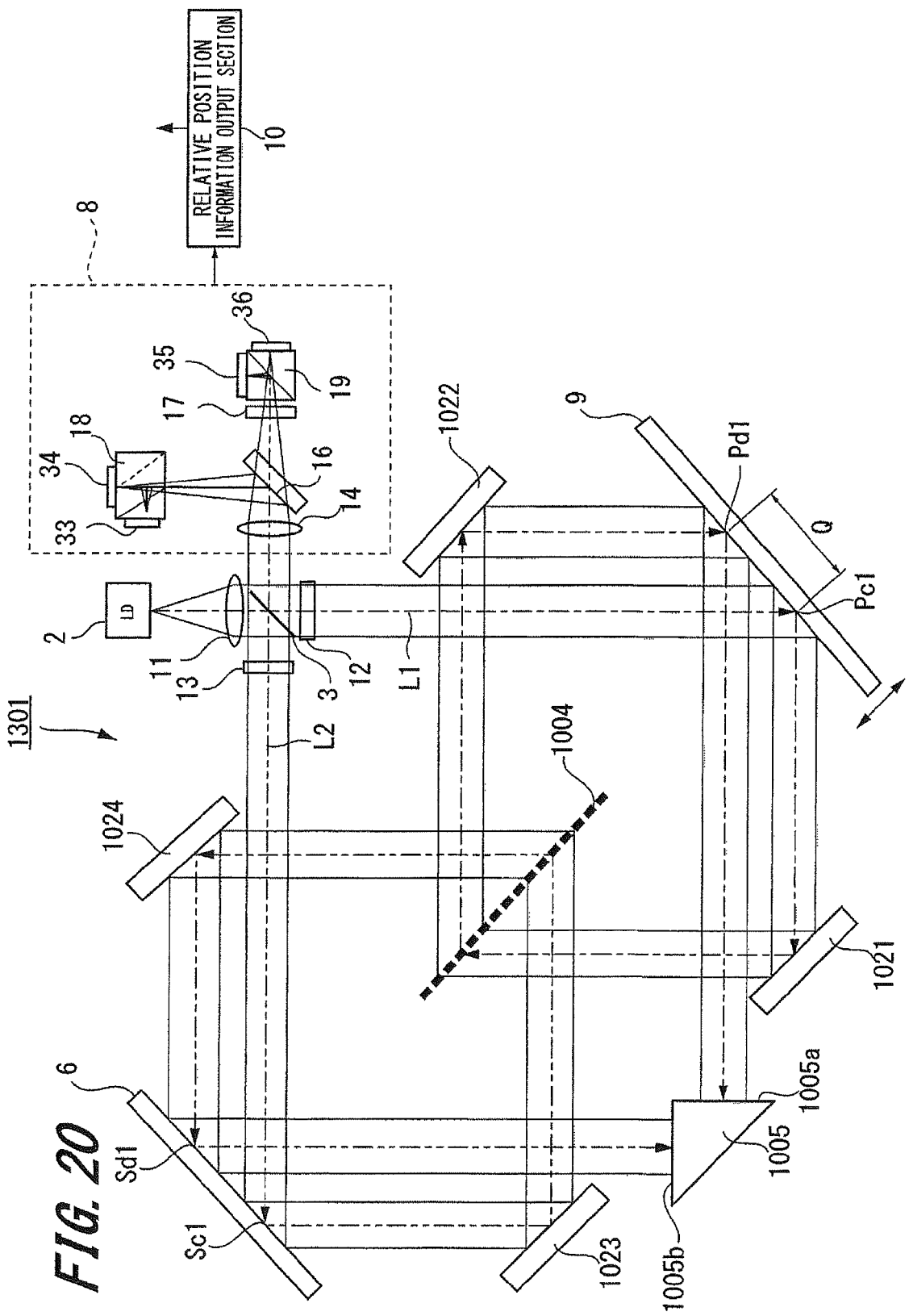
FIG. 20 is a view schematically showing the configuration of a displacement detecting device according to an eleventh embodiment of the present invention.

FIG. 20 is a view schematically showing the configuration of the displacement detecting device 1301 according to the eleventh embodiment.

As shown in FIG. 20, similar to the displacement detecting device 1001 of the ninth embodiment, a transmissive diffraction grating 1004 is used in the displacement detecting device 1301 of the eleventh embodiment. The displacement detecting device 1301 of the eleventh embodiment differs from the displacement detecting device 1001 of the ninth embodiment in that the displacement detecting device 1301 is provided with a plurality of auxiliary mirrors. Thus, only the plurality of auxiliary mirrors will be described here, and components common to those of the displacement detecting device 1001 of the ninth embodiment will be denoted by the same reference numerals and the explanation thereof will be omitted.

As shown in FIG. 20, a first auxiliary mirror 1021 and a second auxiliary mirror 1022 are arranged between the diffraction grating 1004 and the member-to-be-measured 9. Further, a third auxiliary mirror 1023 and a fourth auxiliary mirror 1024 are arranged between the diffraction grating 1004 and the mirror 6.

The reflecting surface of the first auxiliary mirror 1021 and the reflecting surface of the second auxiliary mirror 1022 face each other, and the reflecting surface of the third auxiliary mirror 1023 and the reflecting surface of the fourth auxiliary mirror 1024 face each other. Further, the reflecting surface of the first auxiliary mirror 1021 is substantially coplanar with the reflecting surface of the third auxiliary mirror 1023, and the reflecting surface of the second auxiliary mirror 1022 is substantially coplanar with the reflecting surface of the fourth auxiliary mirror 1024.

The first auxiliary mirror 1021 reflects the first beam L1 reflected by the first irradiation spot Pc1 of the member-to-be-measured 9, so that the first beam L1 is incident on the diffraction grating 1004. Further, the first auxiliary mirror 1021 reflects the first beam L1 returned back from the diffraction grating 1004, so that the first beam L1 is incident on the member-to-be-measured 9. The second auxiliary mirror 1022 reflects the first beam L1 first-diffracted by the diffraction grating 1004, so that the first beam L1 is incident at the second irradiation spot Pd1 of the member-to-be-measured 9. Further, the second auxiliary mirror 1022 reflects the first beam L1 returned back from the member-to-be-measured 9, so that the first beam L1 is incident on the diffraction grating 1004.

The third auxiliary mirror 1023 reflects the second beam L2 reflected by the reflection-side first irradiation spot Sc1 of the mirror 6, so that the second beam L2 is incident on the diffraction grating 1004. Further, the third auxiliary mirror 1023 reflects the second beam L2 returned back from the diffraction grating 1004, so that the second beam L2 is incident on the mirror 6. The fourth auxiliary mirror 1024 reflects the second beam L2 first-diffracted by the diffraction grating 1004 to the reflection-side second irradiation spot Sd1 of the mirror 6. Further, the fourth auxiliary mirror 1024 reflects the second beam L2 returned back from the reflection-side second irradiation spot Sd1 of the mirror 6 to the side of the diffraction grating 1004.

In other words, in the displacement detecting device 1301 of the eleventh embodiment, the first beam L1 is incident from the member-to-be-measured 9 onto diffraction grating 1004, or from the diffraction grating 1004 onto the memberto-be-measured 9, through the first and second auxiliary mirrors 1021, 1022. Further, the second beam L2 is incident from the mirror 6 onto diffraction grating 1004, or from the diffraction grating 1004 onto the mirror 6, through the third and fourth auxiliary mirrors 1023, 1024.

Thus, by adjusting the positions of the first and second auxiliary mirrors 1021, 1022, the distance Q between the first irradiation spot Pc1 and the second irradiation spot Pd1, at which the first beam L1 is incident on the member-to-be-measured 9, may be changed according to intended purpose. Incidentally, the distance between the reflection-side first irradiation spot Sc1 and the reflection-side second irradiation spot Sd1 on the mirror 6 may also be changed by adjusting the positions of the third and fourth auxiliary mirrors 1023, 1024.

Thus, it is possible to reduce the distance Q between the first irradiation spot Pc1 and the second irradiation spot Pd1, and therefore it is possible to reduce the optical path length difference between the first irradiation spot Pc1 and the second irradiation spot Pd1 caused by the tilt of the member-to-be-measured 9.

The configuration of the other portions of the displacement detecting device 1301 of the eleventh embodiment is identical to those of the displacement detecting device 1 of the first embodiment and the displacement detecting device 1001 of the ninth embodiment, and therefore description thereof is omitted. With the displacement detecting device 1301 having the aforesaid configuration, the same advantages as those of the displacement detecting device 1 of the first embodiment and the displacement detecting device 1001 of the ninth embodiment can also be achieved.

13. Displacement Detecting Device According to Twelfth Embodiment

Next, a displacement detecting device 1401 according to a twelfth embodiment of the present invention will be described below with reference to FIG. 21.

Figure 21:
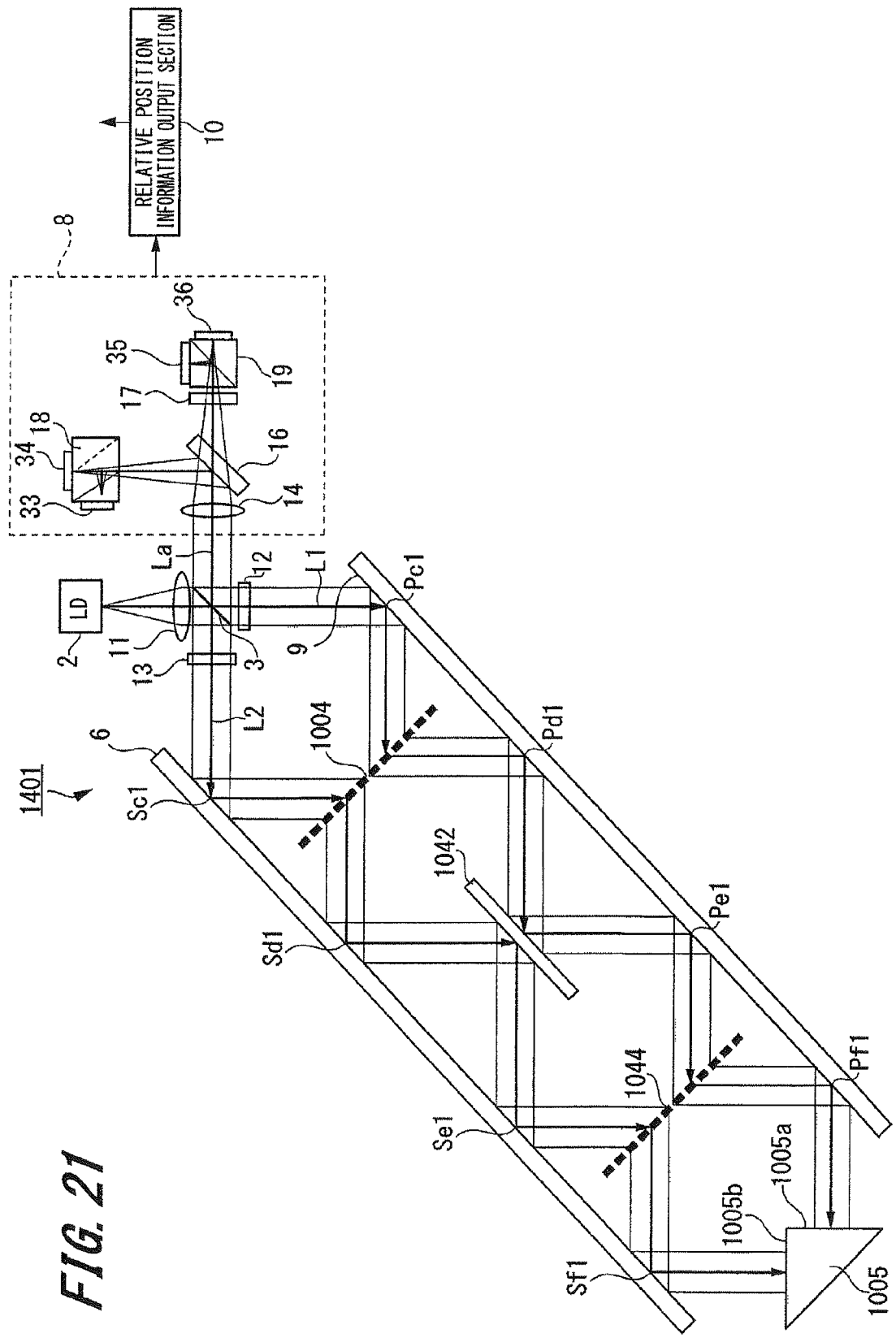
FIG. 21 is a view schematically showing the configuration of a displacement detecting device according to a twelfth embodiment of the present invention.

FIG. 21 is a view schematically showing the configuration of the displacement detecting device 1401 of the twelfth embodiment.

As shown in FIG. 21, similar to the displacement detecting device 1001 of the ninth embodiment, a transmissive diffraction grating 1004 is used in the displacement detecting device 1401 of the twelfth embodiment. The displacement detecting device 1401 of the twelfth embodiment differs from the displacement detecting device 1001 of the ninth embodiment in that the displacement detecting device 1401 is provided with a plurality of diffraction gratings. Thus, only the configuration around the diffraction gratings will be described here, and components common to those of displacement detecting device 1001 of the ninth embodiment will be denoted by the same reference numerals and the explanation thereof will be omitted.

As shown in FIG. 21, the displacement detecting device 1401 of the twelfth embodiment has a first diffraction grating 1004, a second diffraction grating 1044, a return reflecting mirror 1005 and an intermediate mirror 1042 arranged between the member-to-be-measured 9 and the mirror 6. The configuration of the first diffraction grating 1004 is identical to that of the diffraction grating 1004 of the ninth embodiment, and therefore description thereof is omitted.

The second diffraction grating 1044 is arranged between the first diffraction grating 1004 and the return reflecting mirror 1005. Similar to the first diffraction grating 1004, the second diffraction grating 1044 is arranged so that it extends substantially at a right angle with respect to the surface-to-be-measured of the member-to-be-measured 9 (i.e., the angle between the diffraction surface of the second diffraction grating 1044 and the surface-to-be-measured of the member-to-be-measured 9 is substantially 90°). Further, the second diffraction grating 1044 is arranged so that it extends substantially at a right angle with respect to the reflecting surface of the mirror 6.

The intermediate mirror 1042 is arranged between the second diffraction grating 1044 and the first diffraction grating 1004. The both surfaces of the intermediate mirror 1042 are reflecting surfaces. The intermediate mirror 1042 is arranged so that the reflecting surfaces thereof are substantially parallel to both the surface-to-be-measured of the member-to-be-measured 9 and the reflecting surface of the mirror 6.

In the displacement detecting device 1401 of the twelfth embodiment, the first beam L1 transmitted through and first-diffracted by the first diffraction grating 1004 is incident at a second irradiation spot Pd1 on the surface-to-be-measured of the member-to-be-measured 9. Further, the first beam L1 incident at the second irradiation spot Pd1 is reflected by the member-to-be-measured 9 to the intermediate mirror 1042.

Further, the first beam L1 reflected to the intermediate mirror 1042 is incident at a third irradiation spot Pe1 on the surface-to-be-measured of the member-to-be-measured 9. Further, the member-to-be-measured 9 reflects the first beam L1 incident at the third irradiation spot Pe1 to the second diffraction grating 1044. Similar to the first diffraction grating 1004, the second diffraction grating 1044 is a reflective diffraction grating that transmits and diffracts the light incident thereon. The second diffraction grating 1044 has the same grating pitch Λ as that of the first diffraction grating 1004.

Thus, by being transmitted through the second diffraction grating 1044, the first beam L1 is second-diffracted. The second-diffracted first beam L1 is incident at a fourth irradiation spot Pf1 on the surface-to-be-measured of the member-to-be-measured 9 so as to be reflected by the member-to-be-measured 9 to the first reflecting surface 1005a of the return reflecting mirror 1005.

Further, the first beam L1 incident on the return reflecting mirror 1005 is reflected by the first reflecting surface 1005a and third-diffracted by the second diffraction grating 1044 along the same optical path as the advancing optical path. The third-diffracted first beam L1 is reflected by both the member-to-be-measured 9 and the intermediate mirror 1042, and incident on the first diffraction grating 1004. Further, the first beam L1 is fourth-diffracted by the first diffraction grating 1004. The fourth-diffracted first beam L1 is reflected by the member-to-be-measured 9 so as to return to the beam splitting section 3.

Incidentally, similar to the first beam L1, the second beam L2 transmitted through the first diffraction grating 1004 is reflected by both a reflection-side third irradiation spot Se1 and a reflection-side fourth irradiation spot Sf1 of the mirror 6, and incident on the second reflecting surface 1005b of the return reflecting mirror 1005 through the intermediate mirror 1042 and the second diffraction grating 1044. Further, the second beam L2 is reflected by the return reflecting mirror 1005 and returns to the beam splitting section 3 through the second diffraction grating 1044, the intermediate mirror 1042 and the first diffraction grating 1004.

Further, in the displacement detecting device 1401 of the twelfth embodiment, the first diffraction grating 1004, the intermediate mirror 1042, the second diffraction grating 1044 and the return reflecting mirror 1005 are arranged so that the optical path length of the first beam L1 and the optical path length of the second beam L2 are equal to each other.

Further, similar to the first diffraction grating 1004, the second diffraction grating 1044 is arranged so that it extends substantially at a right angle with respect to the surface-tobe-measured of the member-to-be-measured 9. Even if the member-to-be-measured 9 is displaced in the height direction, the optical path length of the first beam L1 will always be constant. In other words, the wavelength of the first beam L1 will not change. Further, when the member-to-be-measured 9 is displaced in the height direction, only the incident position on the second diffraction grating 1044 will change.

Further, in the displacement detecting device 1401 of the twelfth embodiment, the first beam L1 and the second beam L2 are diffracted four times by the first diffraction grating 1004 and the second diffraction grating 1044.

Here, when the member-to-be-measured 9 moves in the height direction by a distance of x/2, a phase increment of 4Kx, which is twice as much as that of the displacement detecting device 1001 of the ninth embodiment, will be added to the phase of the first beam L1. In other words, an interference signal expressed by "A cos(4Kx+δ)" can be obtained by the first light receiving element 33 and the second light receiving element 34. Further, an interference signal expressed by "A cos(4Kx+δ')" can be obtained by the third light receiving element 35 and the fourth light receiving element 36. As a result, with the displacement detecting device 1401 of the twelfth embodiment, a resolution twice as high as that of the displacement detecting device 1001 of the ninth embodiment can be achieved.

Incidentally, although the displacement detecting device 1401 of the twelfth embodiment is described based on an example in which two diffraction gratings are provided, the number of the diffraction grating is not limited to two, but three or more diffraction gratings may be arranged between the beam splitting section and the beam combining section through which the first beam L1 passes.

Further, in the case where a plurality of diffraction gratings are provided to perform a plurality of diffractions (such as the case of the displacement detecting device 1401 of the twelfth embodiment), it is preferred the diffraction grating 1004B, by which the amount of the diffracted light is less reduced, is used as the applicable diffraction grating.

The configuration of the other portions of the displacement detecting device 1401 of the twelfth embodiment is identical to those of the displacement detecting device 1 of the first embodiment and the displacement detecting device 1001 of the ninth embodiment, and therefore description thereof is omitted. With the displacement detecting device 1401 having the aforesaid configuration, the same advantages as those of the displacement detecting device 1 of the first embodiment and the displacement detecting device 1001 of the ninth embodiment can also be achieved.

14. Modifications of Member-to-be-Measured

Next, modifications of the member-to-be-measured will be described below with reference to FIGS. 22A to 22D, FIGS. 23E to 23G, and FIGS. 24A to 24E.

FIGS. 22A to 22D and FIGS. 23E to 23G are cross-sectional views each showing a member-to-be-measured. FIGS. 24A to 24E are plan views and cross-sectional views viewed from the front face of the member-to-be-measured.

Further, in the first embodiment, the first beam L1 incident on the diffraction grating 4 is the light reflected by the member-to-be-measured 9 (i.e., the first beam L1 incident on the diffraction grating 4 is 0-order light). Movement of the grating pitch of the member-to-be-measured is not added to the first beam L1 incident on the diffraction grating 4. Thus, as shown in FIGS. 22A to 22D, FIGS. 23E to 23G, and FIGS. 24A to 24E, the so-called diffraction grating scales of a plurality of members-to-be-measured 9A to 9G, 109, 209, 309, 309A, 409, 509 each having grating 9c, 9c', grooves (slits) d, d1, d2 may also be used.

Figure 22A:
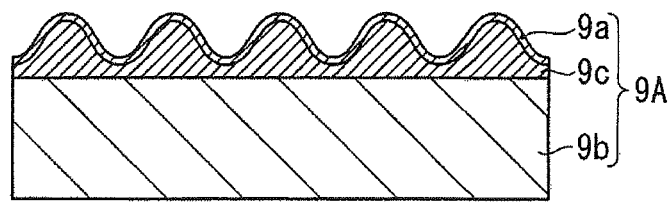
FIG. 22A to FIG. 22D are cross-sectional views each showing a modification of the member-to-be-measured.

The member-to-be-measured 9A shown in FIG. 22A has a corrugated grating 9c provided on the substrate 9b thereof. Further, a reflective film 9a is formed on the surface of the grating 9c. The member-to-be-measured 9B shown in FIG. 22B has a rectangular grating 9c' provided on the substrate 9b thereof. The configuration of the other portions of the member-to-be-measured 9B is identical to that of the member-to-be-measured 9A shown in FIG. 22A, and therefore description thereof is omitted. Incidentally, in the members-to-be-measured 9A, 9B shown in FIGS. 22A and 22B, the gratings 9c, 9c' are exposed.

Figure 22B:
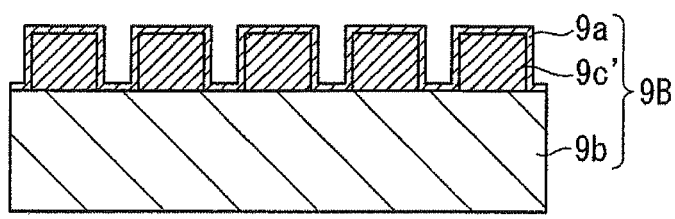
Figure 22C:
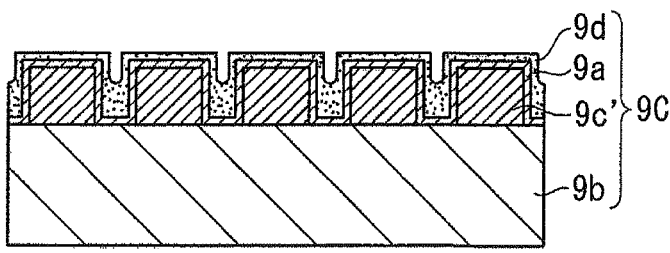

The member-to-be-measured 9C shown in FIG. 22C is formed by forming a protective layer 9d on the reflective film 9a of the member-to-be-measured 9B shown in FIG. 22B. Since the reflective film 9a is protected by the protective layer 9d, operability can be improved.

Figure 22D:
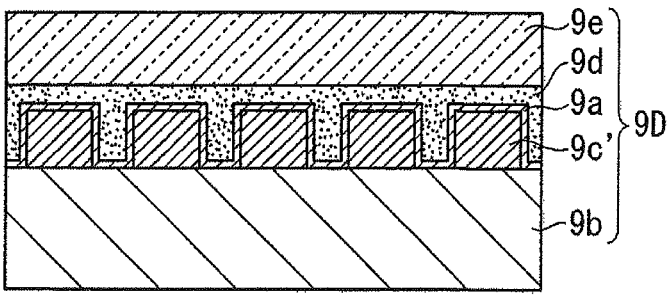

The member-to-be-measured 9D shown in FIG. 22D is formed by fixing a cover glass 9e to the reflective film 9a of the member-to-be-measured 9B shown in FIG. 22B through an adhesion layer 9d. With the member-to-be-measured 9D, the cover glass 9e can play a role as a protective layer. Further, the surface of the member-to-be-measured 9D can be flattened by the cover glass 9e.

Figure 23E:
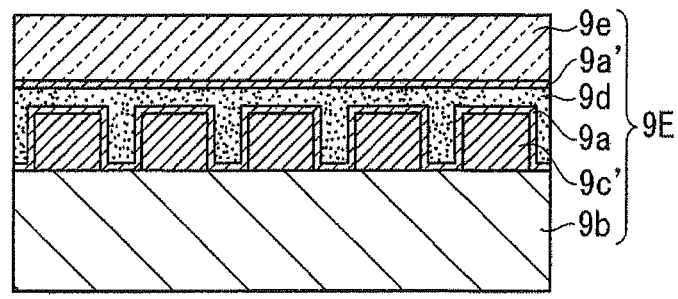
FIG. 23E to FIG. 23G are cross-sectional views each showing a modification of the member-to-be-measured.

Further, as the member-to-be-measured 9E shown in FIG. 23E, a second reflective film 9a' may be interposed between the adhesion layer 9d and the cover glass 9e of the member-to-be-measured 9D shown in FIG. 22D. The second reflective film 9a' is adapted to reflect the light of specific wavelengths including the wavelength of the light source 2.

Figure 23F:
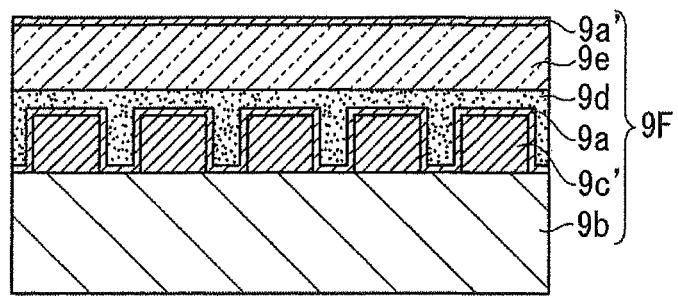

Further, as the member-to-be-measured 9F shown in FIG. 23F, a second reflective film 9a' may arranged on the cover glass 9e of the member-to-be-measured 9D shown in FIG. 22D. The second reflective film 9a' is identical to the reflective film 9a' of the member-to-be-measured 9E shown in FIG. 23E. Further, the second reflective film 9a' may also serve as an antireflection film. In such a case, the surface-to-be-measured becomes a first reflective film 9a formed on a grating 9a'.

Figure 23G:
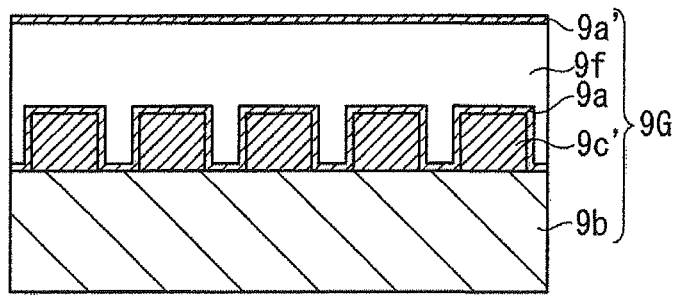

Further, the member-to-be-measured 9G shown in FIG. 23G is a member-to-be-measured in which a transparent protective layer 9f is used instead of the cover glass 9e. Obviously a protective layer formed of a resin may be used as the protective layer 9f. Further, the second reflective film 9a' may also serve as an antireflection film. In such a case, the surface-to-be-measured becomes a first reflective film 9a formed on a grating 9a'.

Figure 24A:
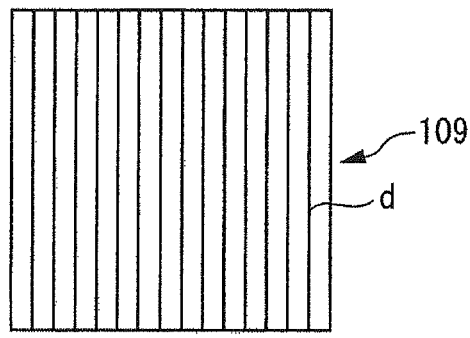
FIG. 24A to FIG. 24E are views each showing a modification of the member-to-be-measured.

The member-to-be-measured 109 shown in FIG. 24A has slits d formed therein, wherein the slits d are arranged at an equal interval in a direction parallel to the surface-to-be-measured. With the member-to-be-measured 109, it is possible to perform a one-dimensional measurement by using a linear encoder.

Figure 24B:
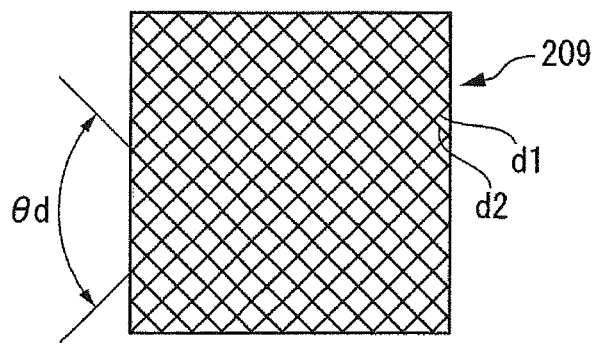

The member-to-be-measured 209 shown in FIG. 24B has first slits d1 and second slits d2 formed therein, wherein the first slits d1 and the second slits d2 are each arranged parallel to the surface-to-be-measured at an equal interval, and the second slits d2 intersect with the first slits d1 at an angle θd. The grating pitch of the first slit d1 may be equal to or different from the grating pitch of the second slit d2. With the member-to-be-measured 209, it is possible to perform a two-dimensional measurement by using two linear encoders.

Figure 24C:
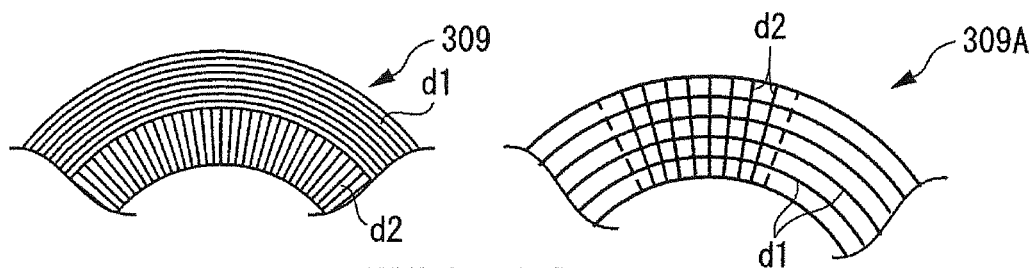
Figure 24D:
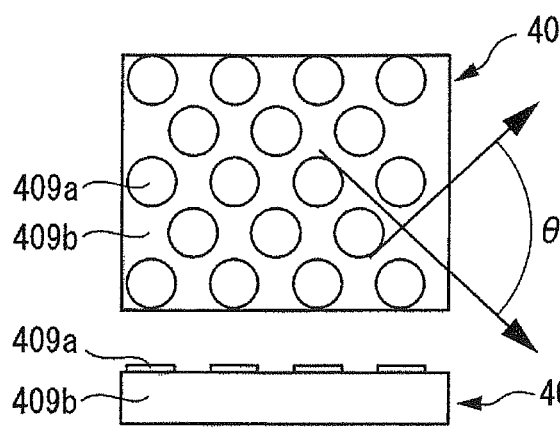

The member-to-be-measured 309 shown in FIG. 24C has first slits d1 and second slits d2 formed therein, wherein the first slits d1 are formed in substantially concentric arc-shape, and the second slits d2 are radially formed. The member-to-be-measured 309 can be used as a so-called rotary encoder to detect the position of the movable portion(s) of a rotating machine tool. Further, with the member-to-be-measured 309, it is possible to also measure eccentric component in the radial direction while detecting angular information. Further, as the member-to-be-measured 309A shown in FIG. 24C, the first slits d1 and the second slits d2 may also be superimposed on each other.

Figure 24E:
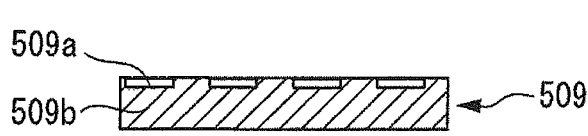

The member-to-be-measured 409 shown in FIG. 24E has a plurality of substantially cylindrical projections 409a formed on one surface of a substrate 409b thereof. In the member-to-be-measured 409, the gaps between the plurality of projections 409a become grating slits. Two grating vector directions intersect with each other at an angle θe. Incidentally, the projection 409a is not limited to having a substantially cylindrical shape, but may also have a square truncated-pyramid shape, a rectangular parallelepiped-shape or the like.

The member-to-be-measured 509 shown in FIG. 24F (which is in contrast with the member-to-be-measured 409 shown in FIG. 24E) has a plurality of substantially cylindrically recessed portions 509a formed on one surface of a substrate 509b thereof. In the member-to-be-measured 509, the gaps between the plurality of recessed portions 509a become grating slits.

15. Application Examples of Displacement Detecting Device

Next, application examples of the displacement detecting devices of the first to twelfth embodiments will be described below with reference to FIG. 25 and FIG. 26.

Figure 25:
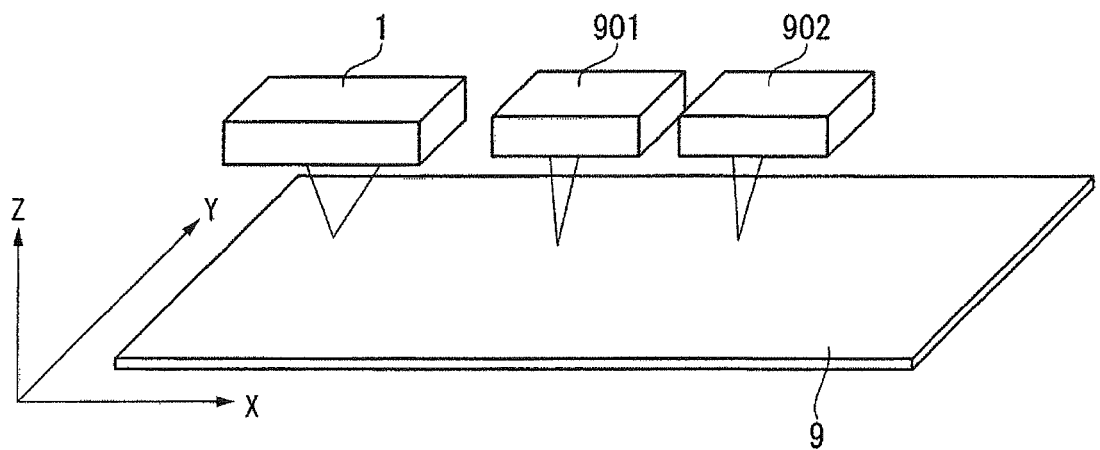
FIG. 25 is a schematic view showing a first application example of the displacement detecting device according to the present invention.

FIG. 25 is a schematic view showing a first application example. FIG. 26 is a schematic view showing a second application example.

Figure 26:
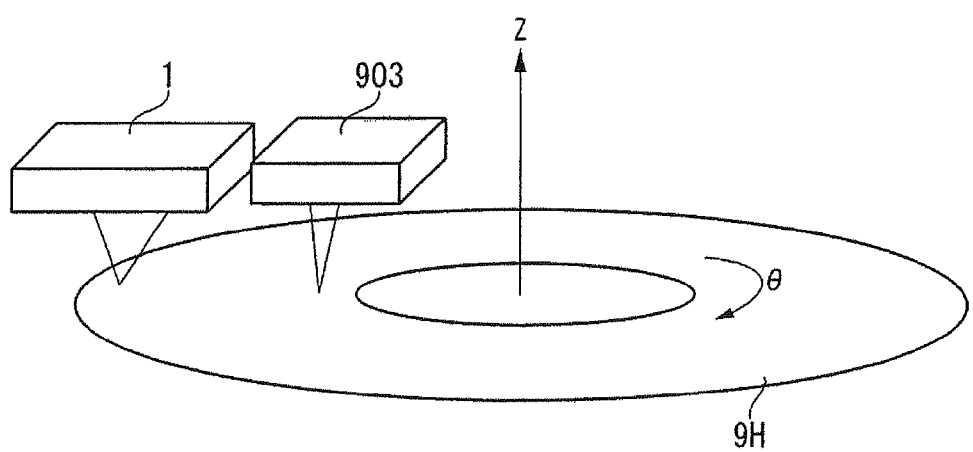
FIG. 26 is a schematic view showing a second application example of the displacement detecting device according to the present invention.

Incidentally, in the member-to-be-measured 9 and member-to-be-measured 9H of the application examples shown in FIG. 25 and FIG. 26, one of the diffraction grating scales shown in FIGS. 23E to 23G, and FIGS. 24A to 24E, for example, is used.

In the application example shown in FIG. 25, a linear encoder for X-axis 901 and a linear encoder for Y-axis 902 are provided. The linear encoder for X-axis 901 is adapted to detect the displacement of the member-to-be-measured 9 in a first direction X parallel to the surface-to-be-measured of the member-to-be-measured 9, and the linear encoder for Y-axis 902 is adapted to detect the displacement of the member-to-be-measured 9 in a second direction Y parallel to the surface-to-be-measured of the member-to-be-measured 9, wherein the second direction Y is perpendicular to the first direction X. Further, the displacement detecting device 1 of the first embodiment is provided for detecting the displacement of the member-to-be-measured 9 in the height direction Z.

With such arrangement, the displacements of the member-to-be-measured 9 in X-axis and Y-axis can be detected by the linear encoder for X-axis 901 and the linear encoder for Y-axis 902, and the displacement of the member-to-be-measured 9 in the height direction of the surface-to-be-measured of the member-to-be-measured 9 (i.e., the displacement in Z-axis) can be detected by the displacement detecting device 1 of the first embodiment. Thus, it is possible to perform three-dimensional measurement.

A member-to-be-measured 9H of the application example shown in FIG. 26 rotates with the Z-axis as the rotation center. In such application example, a rotary encoder 903 and the displacement detecting device 1 of the first embodiment are provided, wherein the rotary encoder 903 is adapted to detect angular information of the member-to-be-measured 9H, and the displacement detecting device 1 is adapted to detect the displacement of the member-to-be-measured 9 in the height direction Z. With such application example, it is possible to detect the angular information θ and the displacement in Z-axis of the member-to-be-measured 9H, so that it is possible to perform three-dimensional measurement.

16. Displacement Detecting Devices According to Further Other Embodiments

Displacement detecting devices according to further other embodiments of the present invention will be described below with reference to FIGS. 27 to 31.

Displacement detecting devices 1501, 1601 and 1701 shown in FIGS. 27 to 31 are each a device adapted to detect the displacement information of a member that has two reflecting surface facing each other with a space therebetween.

16-1. Displacement Detecting Device According to Thirteenth Embodiment

First, a displacement detecting device 1501 according to a thirteenth embodiment of the present invention will be described below with reference to FIG. 27, FIG. 28, FIG. 29A, and FIG. 29B.

Figure 27:
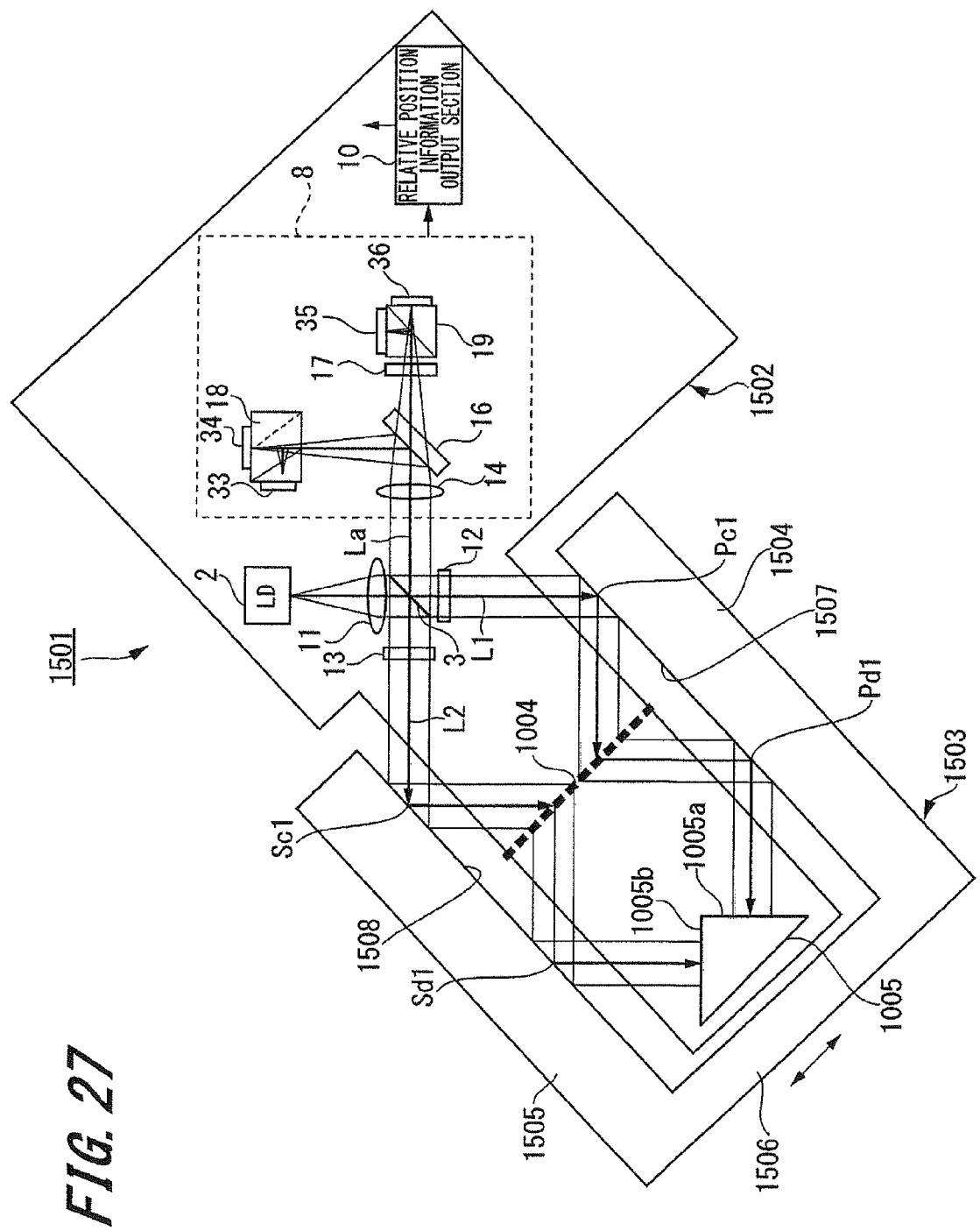
FIG. 27 is a view schematically showing the configuration of a displacement detecting device according to a thirteenth embodiment of the present invention.
Figure 28:
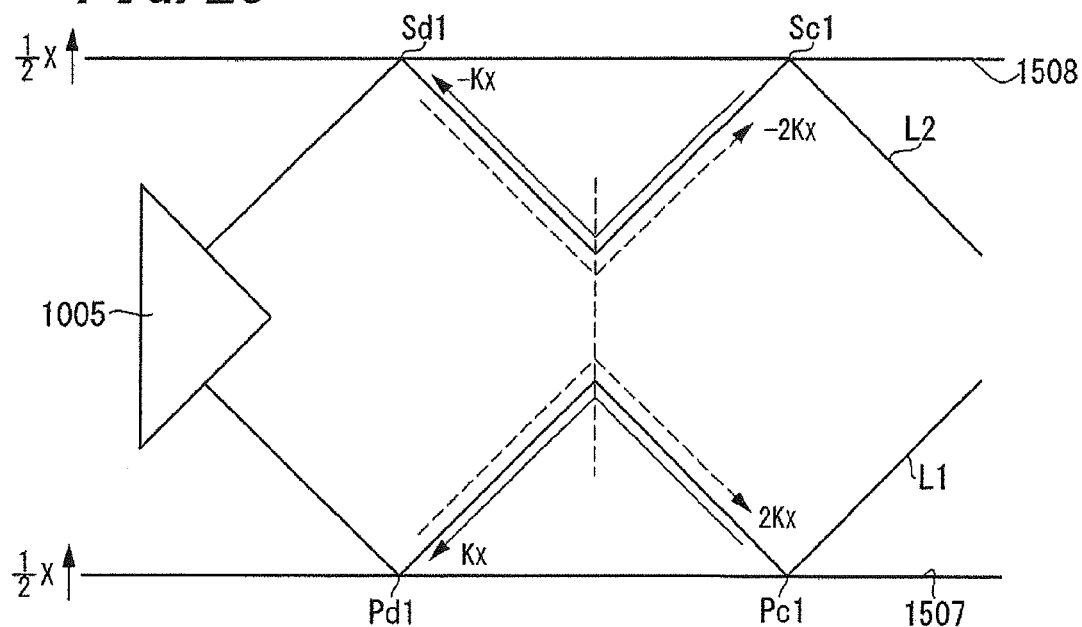
FIG. 28 is a view for explaining a primary portion of the displacement detecting device according to the thirteenth embodiment.

FIG. 27 is a view schematically showing the configuration of the displacement detecting device 1501 of the thirteenth embodiment, and FIG. 28 is a view for explaining a primary portion of the displacement detecting device 1501 shown in FIG. 27.

As shown in FIG. 27, the first reflecting surface 1507 according to the thirteenth embodiment includes an optical system block 1502, and a block-to-be-measured 1503 mounted on the member-to-be-measured. The displacement detecting device 1501 can detect relative displacement between the optical system block 1502 and the block-to-be-measured 1503. In other words, in the displacement detecting device 1501 according to thirteenth embodiment, the block-to-be-measured 1503 is equivalent to the member-to-be-measured.

The optical system block 1502 includes a light source 2, a beam splitting section 3, a transmissive diffraction grating 1004, a light receiving section 8, a relative position information output section 10, and a return reflecting mirror 1005. The light source 2, the beam splitting section 3, the diffraction grating 1004, the light receiving section 8, the relative position information output section 10 and the return reflecting mirror 1005 of the optical system block 1502 have the same configurations as the light source 2, the beam splitting section 3, the diffraction grating 1004, the light receiving section 8, the relative position information output section 10 and the return reflecting mirror 1005 of the displacement detecting device 1001 of the ninth embodiment.

The block-to-be-measured 1503 is substantially U-shaped. The block-to-be-measured 1503 includes a first reflecting piece 1504, a second reflecting piece 1505, and a connecting piece 1506. The first reflecting piece 1504 and the second reflecting piece 1505 face each other. The first reflecting piece 1504 and the second reflecting piece 1505 each have one end thereof connected to the connecting piece 1506. Thus, when the block-to-be-measured 1503 moves in the height direction, the first reflecting piece 1504 and the second reflecting piece 1505 will move by the same distance.

Further, one surface of the first reflecting piece 1504 facing the second reflecting piece 1505 is a first reflecting surface 1507 that reflects light. Similarly, one surface of the second reflecting piece 1505 facing the first reflecting piece 1504 is a second reflecting surface 1508 that reflects light. The first reflecting surface 1507 of the first reflecting piece 1504 and the second reflecting surface 1508 of the second reflecting piece 1505 are substantially parallel to each other.

A portion having the diffraction grating 1004 and the return reflecting mirror 1005 of the optical system block 1502 arranged therein is inserted between the first reflecting piece 1504 and the second reflecting piece 1505 of the block-to-be-measured 1503. At this time, one surface (i.e., a so-called diffraction surface) of the diffraction grating 1004 is substantially perpendicular to both the first reflecting surface 1507 of the first reflecting piece 1504 and the second reflecting surface 1508 of the second reflecting piece 1505. Further, the return reflecting mirror 1005 is arranged on the side of the connecting piece 1506 of the block-to-be-measured 1503.

The configuration of the other portions of the displacement detecting device 1501 of the thirteenth embodiment is identical to that of the displacement detecting device 1001 of the ninth embodiment, and therefore description thereof is not repeated here.

Here, a primary portion of the displacement detecting device 1501 of the thirteenth embodiment will be described below with reference to FIG. 28.

As shown in FIG. 28, when the block-to-be-measured 1503 moves in the height direction by a distance of x/2, the first reflecting surface 1507 of the first reflecting piece 1504 and the second reflecting surface 1508 of the second reflecting piece 1505 will also move in the height direction by a distance of x/2.

Since the diffraction grating 1004 is substantially perpendicular to both the first reflecting surface 1507 and the second reflecting surface 1508 of the block-to-be-measured 1503, even if the block-to-be-measured 1503 is displaced in the height direction, the optical path length of the first beam L1 and the optical path length of the second beam L2 will always be constant. In other words, similar to the displacement detecting device 1001 of the ninth embodiment, the wavelength of the first beam L1 and the second beam L2 will not change. Further, when the block-to-be-measured 1503 is displaced in the height direction, only the incident position of the first beam L1 and the second beam L2 on the diffraction grating 1004 will change.

Similar to the displacement detecting device 1001 of the ninth embodiment shown in FIG. 17, when the first reflecting surface 1507 and the second reflecting surface 1508 move in the height direction by a distance of x/2, the movement amount of the first beam L1 and the second beam L2 on the diffraction grating 4 will be x, which is twice as much as the movement amount of the first reflecting surface 1507 and the second reflecting surface 1508.

Since the first beam L1 irradiated onto the first reflecting surface 1507 is transmitted through the diffraction grating 1004 twice in advancing and returning, the first beam L1 is diffracted twice. Thus, a phase increment of 2Kx is added to the phase of the first beam L1.

Further, since the second reflecting surface 1508 moves by the same distance as the first reflecting surface 1507 moves, similar to the first beam L1, the incident position of the second beam L2 irradiated onto the second reflecting surface 1508 on the diffraction grating 1004 changes by the same distance as that of the first beam L1.

Here, the first reflecting surface 1507 moves closer to the diffraction grating 1004 by a distance of x/2, and the second reflecting surface 1508 moves away from the diffraction grating 1004 by a distance of x/2. Thus, since the second beam L2 is transmitted through the diffraction grating 1004, a phase increment having opposite sign to that of the first beam L1 is added to the phase of the second beam L2. Similar to the first beam L1, since the second beam L2 is also transmitted through the diffraction grating 1004 twice in advancing and returning, the second beam L2 is diffracted twice. Thus, a phase increment of −2Kx is added to the phase of the second beam L2. Thus, the phase difference between the first beam L1 and the second beam L2 is 4Kx.

In other words, an interference signal expressed by "A cos(4Kx+δ)" can be obtained by the first light receiving element 33 and the second light receiving element 34. Further, an interference signal expressed by "A cos(4Kx+δ')" can be obtained by the third light receiving element 35 and the fourth light receiving element 36. As a result, with the displacement detecting device 1501 of the thirteenth embodiment, it is possible to achieve a resolution twice as high as that of the displacement detecting device 1001 of the ninth embodiment.

Similar to the displacement detecting device 1001 of the ninth embodiment, in the displacement detecting device 1501, for example, the grating pitch Λ of the diffraction grating 1004 is set to 0.5515 μm, the wavelength λ is set to 780 nm, and the incidence angle and the diffraction angle of the diffraction grating 1004 are set to 45 degrees. The description here is made based on an example in which the block-to-be-measured 1503 moves in the height direction by 0.5515 μm, which is equivalent to the grating pitch Λ of the diffraction grating 1004.

When the block-to-be-measured 1503 moves in the height direction by a distance of 0.5515 μm, the first beam L1 and the second beam L2 will move on the diffraction grating 1004 by a distance twice as much as 0.5515 μm, which is equivalent to two pitches. Further, the first beam L1 and the second beam L2 are diffracted twice. Further, since two phase increments of mutually opposite sign are added to the first beam L1 and the second beam L2 respectively, the phase difference between the first beam L1 and the second beam L2 is 8Kx. In other words, one cycle of the obtained signal becomes 0.5515 μm/8 (=0.0689 μm).

With the displacement detecting device 1501 having the aforesaid configuration, the same advantages as those of the displacement detecting device 1 of the first embodiment and the displacement detecting device 1001 of the ninth embodiment can also be achieved.

Next, examples of the block-to-be-measured used in the displacement detecting device 1501 of the thirteenth embodiment will be described below with reference to FIGS. 29A and 29B.

Figure 29A:
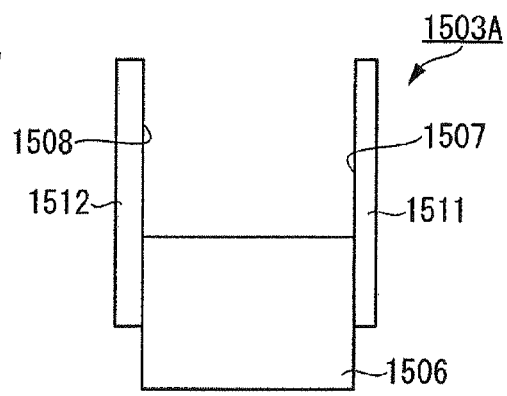
Figure 29B:
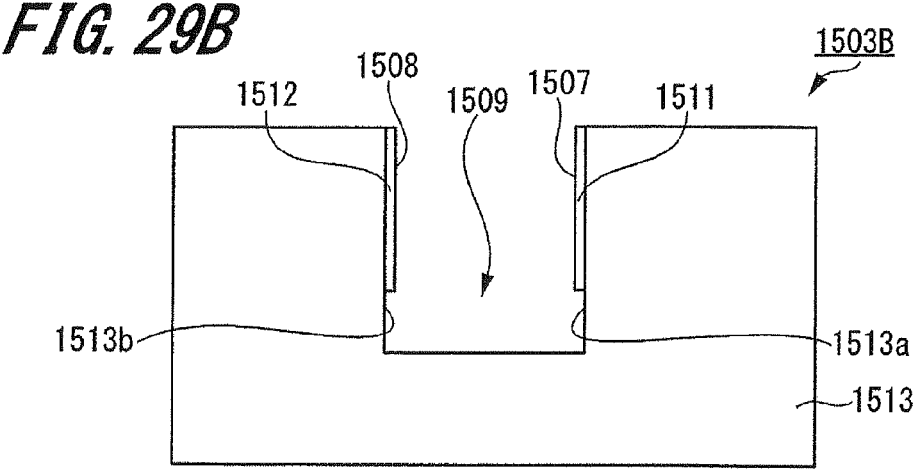

FIG. 29A is a plan view showing an example of the block-to-be-measured, and FIG. 29B is a plan view showing another example of the block-to-be-measured.

A block-to-be-measured 1503A shown in FIG. 26A includes a first reflecting mirror 1511 and a second reflecting mirror 1512, wherein the first reflecting mirror 1511 has a first reflecting surface 1507, and the second reflecting mirror 1512 has a second reflecting surface 1508. The first reflecting mirror 1511 and the second reflecting mirror 1512 are fixed to a connecting piece 1506 by adhesive or by fixation screws. The first reflecting surface 1507 of the first reflecting mirror 1511 and the second reflecting surface 1508 of the second reflecting mirror 1512 are substantially parallel to each other.

Since the block-to-be-measured 1503A is simply configured by attaching two reflecting mirrors 1511, 1512 to the connecting piece 1506, it is easy to miniaturize the entire block.

A block-to-be-measured 1503B shown in FIG. 29B is configured by forming a rectangular groove 1509 in a block piece 1513. A first reflecting mirror 1511 is fixed to one surface 1513a of the groove 1509 formed in the block piece 1513, and a second reflecting mirror 1512 is fixed to the other surface 1513b of the groove 1509, wherein the other surface 1513b faces the one surface 1513a.

The block-to-be-measured 1503B having the aforesaid configuration can be configured by forming the groove 1509 in a member-to-be-measured, and mounting two reflecting mirrors 1511, 1512 on the inner wall of the groove 1509.

16-2. Displacement Detecting Device According to Fourteenth Embodiment

Next, a displacement detecting device 1601 according to an fourteenth embodiment of the present invention will be described below with reference to FIG. 30.

Figure 30:
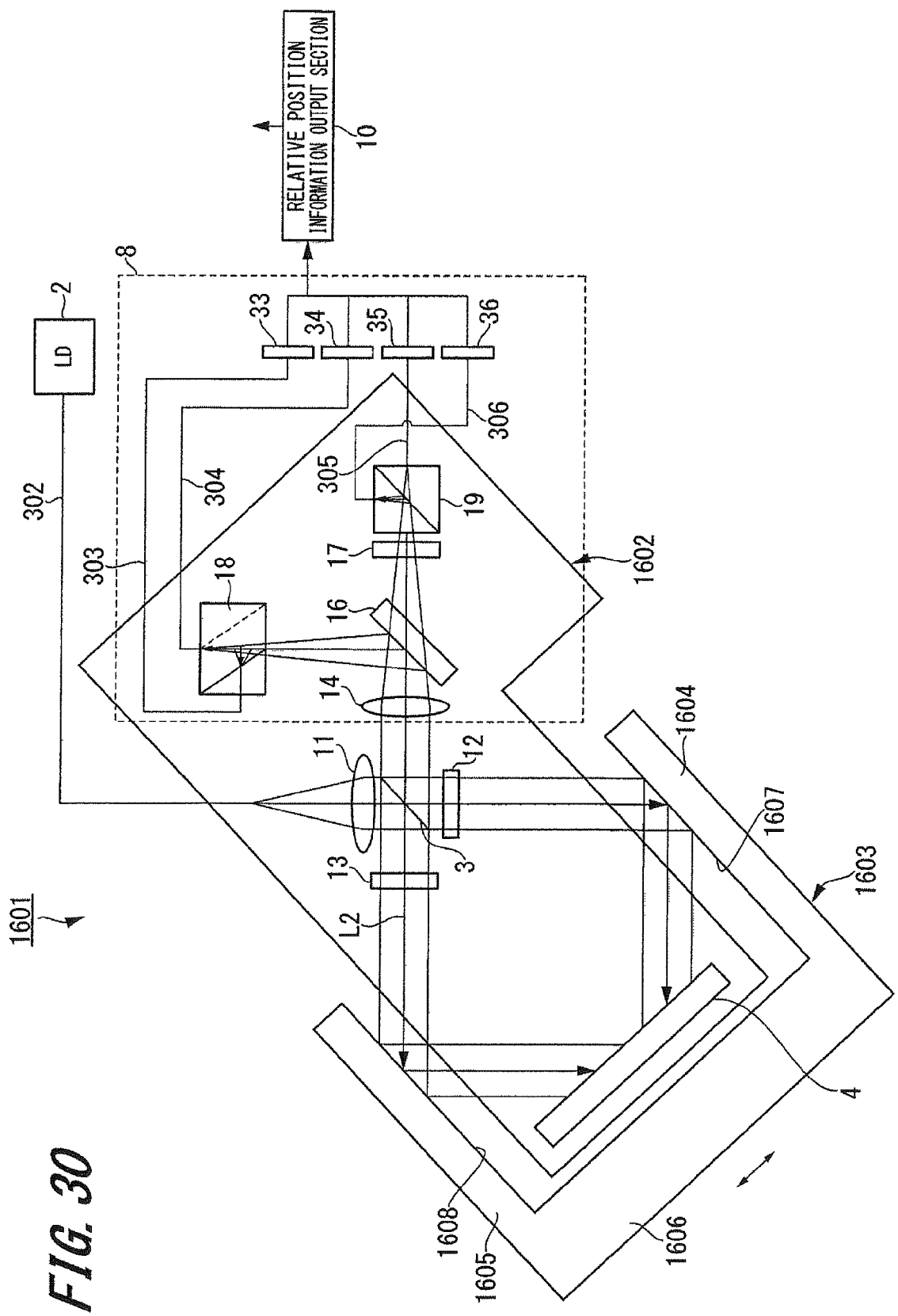
FIG. 30 is a view schematically showing the configuration of a displacement detecting device according to a fourteenth embodiment of the present invention.

FIG. 30 is a view schematically showing the configuration of the displacement detecting device 1601 according to the fourteenth embodiment.

As shown in FIG. 30, similar to the displacement detecting device 1501 of the thirteenth embodiment, the displacement detecting device 1601 of the fourteenth embodiment includes an optical system block 1602 and a block-to-be-measured 1603 mounted on a member-to-be-measured.

Similar to the displacement detecting devices 1, 101, 201, 301, 401, 501, 600, 700 of the first to eighth embodiments shown in FIGS. 1 to 14B, in the displacement detecting device 1601 of the fourteenth embodiment, a reflective diffraction grating 4 is used in the optical system block 1602. Further, similar to the displacement detecting device 301 of the fourth embodiment shown in FIG. 10, the optical system block 1602 includes a lens 11, a beam splitting section 3, a diffraction grating 4, a first polarizing beam splitter 18 and a second polarizing beam splitter 19, wherein the first polarizing beam splitter 18 and the second polarizing beam splitter 19 constitute the light receiving section 8.

The light from the light source 2 is irradiated onto the lens 11 through a light supplying optical fiber 302. The light split by the first polarizing beam splitter 18 is supplied to a first light receiving element 33 and a second light receiving element 34 through a first light receiving optical fiber 303 and a second light receiving optical fiber 304. Further, the light split by the second polarizing beam splitter 19 is supplied to a third light receiving element 35 and a fourth light receiving element 36 through a third light receiving optical fiber 305 and a fourth light receiving optical fiber 306.

With such arrangement, the light source 2, which is a heat source, can be separated from the optical system block 1602. Further, since maintenance of the light source 2 and the first to fourth light receiving elements 33 to 36 can be conducted in a place separated from the optical system block 1602, workability can be improved.

Further, by separating the heat source from the optical system block 1602, the temperature of the optical system block 1602 is suppressed from rising, and therefore it is possible to perform stable measurement. Furthermore, by bringing the first to fourth light receiving elements 33 to 36 close to the relative position information output section 10, the influence of the exogenous electrical noise can be reduced, and therefore it is possible to increase response speed. Similar the displacement detecting device 301 of the fourth embodiment, in accordance with the intended purpose, it is also possible to only separate the light source 2 from the optical system block by an optical fiber or only separate the light receiving elements 33 to 36 from the optical system block by optical fibers.

The block-to-be-measured 1603 is mounted to the optical system block 1602 so that one surface (i.e., a so-called diffraction surface) of the diffraction grating 4 of the optical system block 1602 is substantially perpendicular to both a first reflecting surface 1607 and a second reflecting surface 1608 of the block-to-be-measured 1603.

Further, the first beam L1 split by the beam splitting section 3 is reflected by the first reflecting surface 1607 so as to be incident on the diffraction grating 4. Similarly, the second beam L2 is reflected by the second reflecting surface 1608 so as to be incident on the diffraction grating 4.

When the block-to-be-measured 1603 moves in the height direction, a first reflecting piece 1604 and a second reflecting piece 1605 will also move. Thus, similar to the displacement detecting device 1501 of the thirteenth embodiment, in the displacement detecting device 1601 of the fourteenth embodiment, two phase increments of mutually opposite sign are added to the first beam L1 and the second beam L2 respectively.

As a result, with the displacement detecting device 1601 of the fourteenth embodiment, if the grating pitch of the diffraction grating 4 is the same, it is possible to achieve a resolution twice as high as that of the displacement detecting device 301 of the fourth embodiment.

The configuration of the other portions of the displacement detecting device 1601 of the fourteenth embodiment is identical to those of the displacement detecting device 1 of the first embodiment and the displacement detecting device 1501 of the thirteenth embodiment, and therefore description thereof is omitted. With the displacement detecting device 1601 having the aforesaid configuration, the same advantages as those of the displacement detecting device 1 of the first embodiment and the displacement detecting device 1501 of the thirteenth embodiment can also be achieved.

16-3. Displacement Detecting Device According to Fifteenth Embodiment

Next, a displacement detecting device 1701 according to an fifteenth embodiment of the present invention will be described below with reference to FIG. 31.

Figure 31:
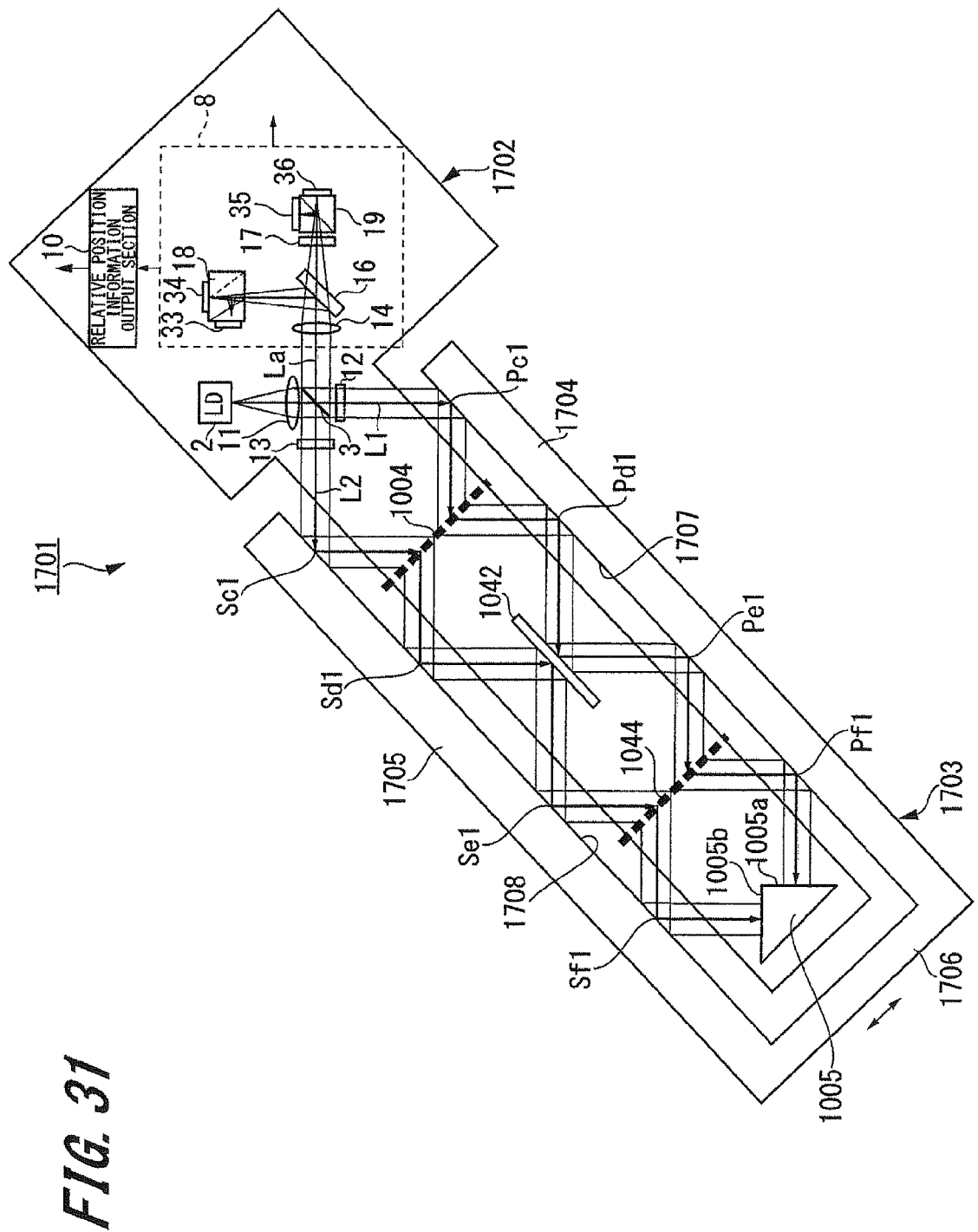
FIG. 31 is a view schematically showing the configuration of a displacement detecting device according to a fifteenth embodiment of the present invention.

FIG. 31 is a view schematically showing the configuration of the displacement detecting device 1701 according to the fifteenth embodiment.

As shown in FIG. 31, similar to the displacement detecting device 1501 of the thirteenth embodiment, the displacement detecting device 1701 of the fifteenth embodiment includes an optical system block 1702 and a block-to-be-measured 1703 mounted on a member-to-be-measured.

Similar to the displacement detecting device 1401 of the twelfth embodiment, the optical system block 1702 includes a light source 2, a beam splitting section 3, a transmissive first diffraction grating 1004, a transmissive second diffraction grating 1044, a light receiving section 8, a relative position information output section 10, a return reflecting mirror 1005, and an intermediate mirror 1042. Further, the block-to-be-measured 1703 includes a first reflecting piece 1704 and a second reflecting piece 1705, between which a portion of the optical system block 1702 is interposed, wherein the portion of the optical system block 1702 includes the diffraction grating 1004, the intermediate mirror 1042, the second diffraction grating 1044 and the return reflecting mirror 1005.

The configuration of the other portions of the displacement detecting device 1701 of the fifteenth embodiment is identical to those of the displacement detecting device 1401 of the twelfth embodiment and the displacement detecting device 1501 of the thirteenth embodiment, and therefore description thereof is omitted. In other words, the displacement detecting device 1701 of the fifteenth embodiment is configured by combining the displacement detecting device 1401 of the twelfth embodiment and the displacement detecting device 1501 of the thirteenth embodiment.

Further, the first beam L1 of the fifteenth embodiment is diffracted four times by the first diffraction grating 1004 and the second diffraction grating 1044 in advancing and returning. Similar to the first beam L1, the second beam L2 is also diffracted four times by the first diffraction grating 1004 and the second diffraction grating 1044 in advancing and returning.

When the block-to-be-measured 1703 moves in the height direction by a distance of x/2, a phase increment of 4Kx is added to the phase of the first beam L1, and a phase increment of −4Kx (which has opposite sign to the phase increment of 4Kx added to the phase of the first beam L1) is added to the phase of the second beam L2. Thus, the phase difference between the first beam L1 and the second beam L2 is 8Kx.

As a result, with the displacement detecting device 1701 of the fifteenth embodiment, it is possible to achieve a resolution twice as high as that of the displacement detecting device 1401 of the thirteenth embodiment.

With the displacement detecting device 1701 having the aforesaid configuration, the same advantages as those of the displacement detecting device 1 of the first embodiment and the displacement detecting device 1401 of the thirteenth embodiment can also be achieved.

The displacement detecting devices 1501, 1601 and 1701 of the thirteenth to fifteenth embodiments can detect the displacement of a leaf spring mechanism by, for example, connecting the optical system block and the block-to-be-measured with the leaf spring. Further, it is possible to detect the displacement information of an actuator by building the optical system block and the block-to-be-measured in the actuator.

It is to be understood that the present invention is not limited to the embodiments described above and shown in the drawings, and various modifications can be made without departing from the spirit and scope of the present invention. In the aforesaid embodiments, the light irradiated by the light source may also be supplied passing through a liquid or a vacuum space, instead of a gas.

Further, the mirror 6 (the reflecting section) may also be moved in conjunction with the movement of the member-to-be-measured 9. In other words, the mirror 6 (the reflecting section) is moved by a movement amount equivalent to the movement amount of the member-to-be-measured 9 in the height direction. Thus, similar to the displacement detecting devices of the thirteenth to fifteenth embodiments, in the displacement detecting devices of the first to twelfth embodiments, a phase increment having opposite sign to that of the first beam L1 can be added to the second beam L2.

What is claimed is:

1. A displacement detecting device comprising:
   a light source for emitting light;
   a beam splitting section adapted to split the light emitted from the light source into a first beam to be incident on a surface-to-be-measured of a member-to-be-measured and a second beam used as reference light;
   a diffraction grating adapted to diffract the first beam split by the beam splitting section and incident on and reflected by the surface-to-be-measured of the member-to-be-measured, and cause the diffracted first beam to be incident again on the surface-to-be-measured of the member-to-be-measured;
   a reflecting section adapted to reflect the second beam split by the beam splitting section to the diffraction grating;
   a beam combining section adapted to superimpose the first beam diffracted by the diffraction grating and reflected again by the surface-to-be-measured and the second beam diffracted by the diffraction grating and reflected again by the reflecting section on each other;
   a light receiving section adapted to receive interfering light of the first beam and the second beam superimposed by the beam combining section; and
   a relative position information output section adapted to output displacement information of the surface-to-be-measured in the height direction based on a change in intensity of the interfering light received by the light receiving section,
   wherein the diffraction grating is arranged so that its surface on which gratings are formed is perpendicular to the surface-to-be-measured of the member-to-be-measured so as to cause an optical path length of the first beam between the beam splitting section and the diffraction grating through an incident position on the member-to-be-measured to be always constant even when the member-to-be-measured is displaced in the height direction,
   wherein the reflecting section is arranged opposite to the member-to-be-measured, with the diffraction grating interposed therebetween, such that a reflecting surface thereof and the surface-to-be-measured of the member-to-be-measured are substantially parallel to each other so as to cause the second light diffracted by the diffraction grating to be incident again on the reflecting section, and an optical path length of the first beam between the beam splitting section and the beam combining section through the member-to-be-measured and the diffraction grating and an optical path length of the second beam between the beam splitting section and the beam combining section through the reflecting section and the diffraction grating are set to be equal to each other, and
   wherein a grating pitch $\Lambda$ of the diffraction grating is set to a value that satisfies $\Lambda=\lambda/(2\sin(\pi/2-\theta))$ when an incident angle on the surface-to-be-measured is $\theta$ and a wavelength of light is $\lambda$, so as to cause a diffraction angle is equal to an incident angle on the diffraction grating.

2. The displacement detecting device according to claim 1, wherein the member-to-be-measured is a reflective diffraction grating scale having a plurality of gratings on the surface-to-be-measured thereof.

3. The displacement detecting device according to claim 2, wherein the plurality of gratings of the member-to-be-measured is covered with a protective layer which is formed of a reflecting film adapted to only reflect specific wavelengths including the wavelength of the light irradiated from the light source.

4. The displacement detecting device according to claim 1, wherein the diffraction grating is a transmissive diffraction grating that transmits the first beam.

5. The displacement detecting device according to claim 4, further comprising:
   a return reflecting section adapted to reflect the first beam diffracted by the diffraction grating and reflected by the surface-to-be-measured of the member-to-be-measured to the surface-to-be-measured of the member-to-be-measured so that the first beam is incident again on the diffraction grating.

6. The displacement detecting device according to claim 4, wherein a plurality of the diffraction gratings are arranged in the optical path of the first beam between the beam splitting section and the beam combining section.

7. The displacement detecting device according to claim 4, wherein the irradiation spot at which the first beam transmitted through and diffracted by the diffraction grating is incident again on the surface-to-be-measured of the member-to-be-measured is different from the irradiation spot at which the first beam split by the beam splitting section is incident on the surface-to-be-measured of the member-to-be-measured.

8. The displacement detecting device according to claim 4, wherein the diffraction grating is formed of a volume hologram that has a grating portion with a predetermined thickness, wherein the thickness of the grating portion is set to four times or more as much as the grating pitch.

9. The displacement detecting device according to claim 1, wherein the diffraction grating is a reflective diffraction grating that reflects the first beam.

10. A displacement detecting device comprising:
a plurality of displacement detecting sections adapted to calculate displacement information of a surface-to-be-measured of a member-to-be-measured in the height direction at a plurality of mutually different arbitrary points; and
an average computing unit adapted to calculate the average value of the displacement information calculated by the plurality of displacement detecting sections,
wherein the plurality of displacement detecting sections each comprise:
a light source for emitting light;
a beam splitting section adapted to split the light emitted from the light source into a first beam to be incident on the surface-to-be-measured of the member-to-be-measured and a second beam used as reference light;
a diffraction grating adapted to diffract the first beam split by the beam splitting section and incident on and reflected by the surface-to-be-measured of the member-to-be-measured, and cause the diffracted first beam to be incident again on the surface-to-be-measured of the member-to-be-measured;
a reflecting section adapted to reflect the second beam split by the beam splitting section to the diffraction grating;
a beam combining section adapted to superimpose the first beam diffracted by the diffraction grating and reflected again by the surface-to-be-measured and the second beam diffracted by the diffraction grating and reflected again by the reflecting section on each other;
a light receiving section adapted to receive interfering light of the first beam and the second beam superimposed by the beam combining section; and
a relative position information output section adapted to output the displacement information of the surface-to-be-measured in the height direction based on a change in intensity of the interfering light received by the light receiving section,
wherein the diffraction grating is arranged so that its surface on which gratings are formed is perpendicular to the surface-to-be-measured of the member-to-be-measured so as to cause an optical path length of the first beam between the beam splitting section and the diffraction grating through an incident position on the member-to-be-measured to be always constant even when the member-to-be-measured is displaced in the height direction,
wherein the reflecting section is arranged opposite to the member-to-be-measured, with the diffraction grating interposed therebetween, such that a reflecting surface thereof and the surface-to-be-measured of the member-to-be-measured are substantially parallel to each other so as to cause the second light diffracted by the diffraction grating to be incident again on the reflecting section, and an optical path length of the first beam between the beam splitting section and the beam combining section through the member-to-be-measured and the diffraction grating and an optical path length of the second beam between the beam splitting section and the beam combining section through the reflecting section and the diffraction grating are set to be equal to each other, and
wherein a grating pitch $\Lambda$ of the diffraction grating is set to a value that satisfies $\Lambda=\lambda/(2 \sin(\pi/2-\theta))$, when an incident angle on the surface-to-be-measured is $\theta$ and a wavelength of light is $\lambda$, so as to cause a diffraction angle that is equal to an incident angle on the diffraction grating.

11. The displacement detecting device according to claim 10, wherein the plurality of displacement detecting sections share one light source, and light is distributed from the shared light source.

12. A displacement detecting device adapted to detect displacement information of a U-shaped member-to-be-measured which includes a first reflecting piece having a first reflecting surface, a second reflecting piece having a second reflecting surface, and a connecting piece, wherein the first reflecting surface and the second reflecting surface are arranged so as to face each other with a space therebetween, and the first reflecting piece and the second reflecting piece are connected to the connecting piece at respective one ends, the displacement detecting device comprising:
a light source for emitting light;
a beam splitting section adapted to split the light emitted from the light source into a first beam to be incident on the first reflecting surface of the member-to-be-measured and a second beam to be incident on the second reflecting surface of the member-to-be-measured;
a diffraction grating adapted to diffract both the first beam split by the beam splitting section and reflected by the first reflecting surface and the second beam split by the beam splitting section and reflected by the second reflecting surface, cause the diffracted first beam to be incident again on the first reflecting surface, and cause the diffracted second beam to be incident again on the second reflecting surface;
a beam combining section adapted to superimpose the first beam diffracted by the diffraction grating and reflected again by the first reflecting surface and the second beam diffracted by the diffraction grating and reflected again by the second reflecting surface on each other;
a light receiving section adapted to receive interfering light of the first beam and the second beam superimposed by the beam combining section; and
a relative position information output section adapted to output displacement information of the member-to-be-measured based on a change in intensity of the interfering light received by the light receiving section,
wherein the diffraction grating is arranged so that its surface on which gratings are formed is perpendicular to the first reflecting surface and the second reflecting surface of the member-to-be-measured so as to cause an optical path length of the first beam between the beam splitting section and the diffraction grating through an incident position on the first reflecting surface of the member-to-be-measured and an optical path length of the second beam between the beam splitting section and the diffraction grating through an incident position on the second reflecting surface of the member-to-be-measured to be each always constant even when the member-to-be-measured is displaced in the height direction, and
wherein a grating pitch $\Lambda$ of the diffraction grating is set to a value that satisfies $\Lambda=\lambda/(2 \sin(\pi/2-\theta))$, when an incident angle on the surface-to-be-measured is $\theta$ and a wavelength of light is $\lambda$, so as to cause a diffraction angle that is equal to an incident angle on the diffraction grating.

* * * * *